(12) United States Patent
Tashiro et al.

(10) Patent No.: US 9,146,965 B2
(45) Date of Patent: Sep. 29, 2015

(54) INFORMATION PROCESSOR, PRIVILEGE MANAGEMENT METHOD, PROGRAM, AND RECORDING MEDIUM

(75) Inventors: Takahito Tashiro, Kanagawa (JP); Tadashi Tsumura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 13/338,194

(22) Filed: Dec. 27, 2011

(65) Prior Publication Data
US 2012/0166485 A1 Jun. 28, 2012

(30) Foreign Application Priority Data

Dec. 27, 2010 (JP) ................................ 2010-289801

(51) Int. Cl.
*G06F 17/30* (2006.01)
*G06F 21/60* (2013.01)
*G06F 21/62* (2013.01)
*G06F 9/44* (2006.01)

(52) U.S. Cl.
CPC ............ *G06F 17/30525* (2013.01); *G06F 8/71* (2013.01); *G06F 21/604* (2013.01); *G06F 21/6218* (2013.01); *G06F 2221/2141* (2013.01)

(58) Field of Classification Search
None
See application file for complete search history.

(56) References Cited

U.S. PATENT DOCUMENTS

| 6,618,808 B1 * | 9/2003 | Johnson et al. ................... 726/4 |
| 6,766,334 B1 * | 7/2004 | Kaler et al. ............................ 1/1 |
| 7,523,128 B1 * | 4/2009 | Miller et al. .......................... 1/1 |
| 8,140,576 B1 * | 3/2012 | Viripaeff et al. ............... 707/781 |
| 8,185,550 B1 * | 5/2012 | Eichler et al. ................. 707/783 |
| 8,332,929 B1 * | 12/2012 | Bhargava et al. ............... 726/17 |
| 8,510,796 B2 * | 8/2013 | Srivastava et al. ................ 726/2 |

(Continued)

FOREIGN PATENT DOCUMENTS

| JP | H08161214 A | 6/1996 |
| JP | H0946668 A | 2/1997 |

(Continued)

OTHER PUBLICATIONS

Linguist et al. "IBM Service Management architecture," 2007, IBM Systems Journal, vol. 35, No. 3, pp. 423-440.*

(Continued)

*Primary Examiner* — Richard Bowen
(74) *Attorney, Agent, or Firm* — Yee & Associates, P.C.; Jeffrey S. LaBaw

(57) ABSTRACT

In an information technology (IT) environment, a technique to manage privileges given to personnel to whom a process is assigned. An information processor includes: a configuration management database that stores resources, personnel, processes, and privileges provided on the resources as configuration items, respectively, the configuration management database prescribing relations between the configuration items including a privilege-dependency relationship between a privilege on a resource and a privilege on another resource required to exercise the privilege, a privilege-request relationship between a process and a privilege required for the process, and a privilege-giving relationship between the personnel and the privilege given to the personnel; and a privilege deriving unit for deriving a goal state of a privilege to be given to corresponding personnel by following the relation with the privilege on the resource required for a process to be executed used as a reference point by referring to the configuration management database.

12 Claims, 14 Drawing Sheets

(56) References Cited

U.S. PATENT DOCUMENTS

| | | | |
|---|---|---|---|
| 2007/0199068 A1* | 8/2007 | Russinovich et al. | 726/16 |
| 2008/0098484 A1* | 4/2008 | Cicchitto et al. | 726/27 |
| 2008/0209398 A1* | 8/2008 | Aikens et al. | 717/121 |
| 2008/0301081 A1* | 12/2008 | Karnik et al. | 706/48 |
| 2008/0319777 A1* | 12/2008 | Hoff | 705/1 |
| 2009/0300711 A1* | 12/2009 | Tokutani et al. | 726/1 |
| 2010/0043051 A1* | 2/2010 | Deputat et al. | 726/1 |
| 2010/0106656 A1* | 4/2010 | Sheth et al. | 705/301 |
| 2010/0169948 A1* | 7/2010 | Budko et al. | 726/1 |
| 2010/0223666 A1* | 9/2010 | Weber et al. | 726/17 |
| 2010/0325159 A1* | 12/2010 | Wright et al. | 707/783 |
| 2010/0325701 A1* | 12/2010 | Sun | 726/4 |
| 2011/0125894 A1* | 5/2011 | Anderson et al. | 709/224 |
| 2011/0302295 A1* | 12/2011 | Westerfeld et al. | 709/224 |
| 2012/0090014 A1* | 4/2012 | Otsuka et al. | 726/1 |
| 2012/0233220 A1* | 9/2012 | Kaschenvsky et al. | 707/803 |

FOREIGN PATENT DOCUMENTS

| | | | |
|---|---|---|---|
| JP | 9293052 A | 11/1997 | |
| JP | 2000250860 A | 9/2000 | |
| JP | 2000259730 A | 9/2000 | |
| JP | 2003331029 A | 11/2003 | |
| JP | 2005244521 A | 9/2005 | |
| JP | 2006285619 A | 10/2006 | |
| JP | 2007004210 A | 1/2007 | |
| JP | 2007511831 A | 5/2007 | |
| JP | 2008033570 A | 2/2008 | |
| JP | 2008059035 A | 3/2008 | |
| JP | 2008097214 A | 4/2008 | |
| JP | 2008171233 A | 7/2008 | |
| JP | 2008250730 A | 10/2008 | |
| JP | 2009037366 A | 2/2009 | |
| JP | 20090193545 A | 8/2009 | |
| WO | 03091889 A1 | 11/2003 | |
| WO | WO 2010106679 A1 * | 9/2010 | |

OTHER PUBLICATIONS

Moeller et al., "Deployment Guide Series: IBM Tivoli Change and Configuration Management Database Configuration Discovery and Tracking v1.1," International Business Machines Corporation, ibm.com, Redbooks, Nov. 21, 2006, 549 pages.

Buecker et al., "Deployment Guide Series: IBM Tivoli Identity Manager 5.0," International Business Machines Corporation, ibm.com, Redbooks, Dec. 10, 2008, 306 pages.

* cited by examiner

| CONFIGURATION ITEM | CATEGORY | MODEL | ATTRIBUTE | | DEFINED RELATION | |
|---|---|---|---|---|---|---|
| SERVER A | RESOURCE | SERVER | CPU MODEL NUMBER | AMOUNT OF MEMORY | is on/in | SERVER ROOM A |
| | | | | | provides | MAINTENANCE A |
| | | | | | provides | POWER-ON A |
| | | | | | contains/equips | OS-A |
| POWER-ON A | PRIVILEGE | SERVER POWER SUPPLY | | ... | is provided on | SERVER A |
| | | | | | requires | ENTERING ROOM A |
| | | | | | is required by | ADMIN A |
| | | | | | is held by | PERSONNEL A |
| | | | | | is needed by | PROCESS A |
| ... | ... | ... | | ... | ... | ... |

FIG. 4

INFORMATION PROCESSOR, PRIVILEGE MANAGEMENT METHOD, PROGRAM, AND RECORDING MEDIUM

1. FIELD

The present invention relates to an Information Technology (IT) service management technology, and particularly to an information processor, a configuration management method, a program, and a recording medium for managing privileges to be given to personnel to whom processes are assigned, respectively, in the IT service management.

2. DESCRIPTION OF THE RELATED ART

In recent years, along with an increase in size of an IT system in organizations such as public offices and companies, cost spent for operations management of the IT system is increasing. Further, with the advance of virtualization technology in recent years, physical resources and virtual resources are mixed with each other and thereby the system configuration gets complex, which makes it difficult to grasp the operations management and the current situation correctly more than ever. Because of these factors, Information Technology Infrastructure Library (ITIL) has come under the spotlight as a framework made by collecting up best practices for improving the quality of IT services and reducing long-term operational costs.

As a core component in the aforementioned ITIL framework, there is a configuration management database (CMDB). The CMDB is a database aimed at managing information on components to be managed in an integrated fashion and providing necessary information when needed in an IT service. The CMDB maintains and manages configuration elements as configuration items (CI), including hardware or software resources, documents, incident history information, and human resources to be targets of service management, and supports a user to grasp also dependence relations between configuration items.

Various CMDB products are provided as software for supporting the construction of the aforementioned CMDB and controlling operational processes on the basis of the CMDB. Leading-edge CMDB products have fulfilling functions in discovery function of automatically discovering information on configuration items to be targets of service management or in tracking function which allows records to be automatically updated, thus enabling a lot of human data entry tasks to be reduced (Non-patent Document 1).

Further, with the aim of enabling data linkage between CMDBs different in schema, Japanese Patent Application Publication No. 2009-193545 (Patent Document 1) discloses a computer system including a repository, which holds a set of data indicating at least one predetermined attribute of a configuration element and a relation with other configuration elements and complying with a first specification for each configuration element, and a discovery unit, which is created from external reference data, from which a set of data complying with the first specification has been detected, and is stored in the aforementioned repository, the discovery unit being for use in detecting external reference data associated with data complying with a second specification from other computer systems. The technique disclosed in Patent Document 1 enables the integration of CMDBs different in access method or data format, thereby enabling existing environments provided from various vendors to be integrated to construct a CMDB.

The aforementioned CMDB, which has been appropriately constructed, enables management processes such as a help desk function, an incident management process, and a problem management process to be smoothly carried out. For example, if an incident is detected or a problem to be improved from the incident is registered, an appropriate person in charge of help desk or in charge of technical support is assigned to respond to a service request or to solve the problem. In this case, the CMDB provides information on system resources or human resources required for the process and provides the assigned person in charge with useful information such as incident history information or current configuration information. Moreover, automation is promoted such as automatically recording an error in response to an error message from a monitoring tool, registering an error ticket, and automatically assigning a person in charge by a linkage with a project management system or a operations management tool.

In order to assign a process to a person in charge to perform processing, however, it is necessary to give privileges to access required resources to the person in charge. For example, in the case of maintenance for a server in a predetermined server room, it is necessary to give the person in charge a privilege to enter/leave the server room in addition to a server maintenance privilege. In the IT service management system of the conventional technology, however, the privilege management of the person in charge has been performed by an individual system, which is other than a system managing resources and personnel. Therefore, it has been difficult to perform privilege management appropriately.

For example, in some cases, a process requires a plurality of resources for processing of the process such as a case of a response to a service request, problem solving, and a project or there is a dependence relation between privileges to use resources like the aforementioned server maintenance. With an increase in resources, the dependence relation gets complex, which makes it difficult to give minimum privileges required for the processing of the process to a person in charge.

Further, a time limit is set for a process in some cases. In terms of security, unnecessary privileges should be removed after a completion of the process. After the dependence relation of the privileges gets complex, however, it is difficult to identify necessary privileges and unnecessary privileges, thereby causing a problem on compliance such that privileges to be normally removed remain even after the completion of a process. Or, if privileges are removed at the time of the completion of one process in the case where a plurality of processes are assigned to a person in charge, it could lead to a defective condition such that privileges necessary for remaining processes are also removed. Particularly, the advance of the virtualization technology in cloud computing of recent years causes the resources such as virtual machines to be added or deleted frequently. This causes the aforementioned problem to be more marked.

In terms of managing the privileges to personnel as described above, there is also provided an account provisioning tool for managing a life cycle including generation, distribution, updating, revoking, and canceling of user account information of a server or an application. For example, "Tivoli Identity Manager" (hereinafter, referred to as TIM) (Non-patent Document 2) enables an actual account in a service of a server or an application to be created, changed, or deleted according to a role or belonging of a person. While the account provisioning tool like the aforementioned TIM associates a person with account provisioning according to the description of a policy, the policy needs to be described anew by hand every time the environment changes and therefore the account provisioning tool has been unsatisfactory because it is impossible to completely prevent a human error, such as forgetting a change or making a description error.

The aforementioned Patent Document 1 describes a technique of managing access privilege data in an access privilege table assuming that the access privilege data is a schema for defining whether a first computer system is able to access external reference data of a second computer system with respect to privilege management. The technique, however, does not manage privileges to be given to personnel to whom a process is assigned.

In view of the background described above, it has been desired to develop a technique that enables appropriate management of privileges to be given to a person in charge, to whom a process is assigned, in such a way as to correspond to resources required for the assigned process in IT service management.

PATENT DOCUMENT 1

Japanese Patent Application Laid-Open No. 2009-193545

NON-PATENT DOCUMENT 1

IBM Red books "Deployment Guide Series: IBM Tivoli Change and Configuration Management Database Configuration Discovery and Tracking v1.1," November 2006

NON-PATENT DOCUMENT 2

IBM Red books "Deployment Guide Series: IBM Tivoli Identity Manager 5.0," December 2008

SUMMARY

The present invention has been made in view of the above problem of the aforementioned conventional technology. Therefore, it is an object of the present invention to provide an information processor, a privilege management method, a program, and a recording medium for providing support in IT service management on efficiently deriving a goal state, which complies with the standards, to be given to a person in charge to whom a process is assigned, and thus on maintaining and managing a state where the minimum privileges are given to the person in charge.

In order to solve the above problem of the conventional technology, the present invention provides an information processor having features described below. The information processor of the present invention has a configuration management database having a configuration for storing resources, personnel, processes, and further privileges provided on the resources as configuration items. Within the configuration management database in the present invention, there are defined relations between configuration items, including a privilege-dependency relationship between a privilege on a resource and a privilege on another resource required to exercise the privilege, a privilege-request relationship between a process and a privilege required for the process, and a privilege-giving relationship between personnel and the privilege given to the personnel.

The information processor of the present invention derives a goal state of privileges to be given to corresponding personnel by following the relation with the privileges on the resources required for a process to be executed used as reference points, in the case where the process to be executed is assigned to the corresponding personnel, by referring to the configuration management database. For example, a goal state is defined as a privilege state complying with the standards that the minimum privileges should be given to the corresponding personnel and then an inconsistency between the goal state and the current state is able to be derived. Moreover, the aforementioned inconsistency may include a lacking privilege and a redundant privilege or one of these privileges with respect to the corresponding personnel.

Further, in the present invention, in the case where resources are associated with an existing resource anew, a privilege-dependency relationship, in which a privilege on the existing resource should be associated with a privilege on each resource, can be defined according to predetermined conditions set with respect to the existing resource. Here, the predetermined conditions define how to relate the existing resource to another resource. The present invention further enables an inconsistency between the goal state and the current state to be derived with respect to each of the corresponding personnel assigned to one or more existent processes by following the aforementioned relation with privileges required for one or more existent processes as reference points.

According to the above configuration, it is possible to derive minimum privileges for personnel in consideration of the privileges on other resources needed to exercise the privilege on a resource by following the relation between the privilege on the resource and the privilege on other resources. Therefore, the present invention enables the principle of minimum privileges in security to be satisfied more easily.

BRIEF DESCRIPTION OF THE SEVERAL VIEWS OF THE DRAWINGS

FIG. 4 is a diagram illustrating a data structure of the configuration management database constructed by a functional unit for constructing and updating the configuration management database;

DETAILED DESCRIPTION

Hereinafter, the present invention will be described through embodiments. The following description, however, is not intended to limit the present invention to the contents described in the embodiments described later. In the embodiments described below, the present invention will be described taking as an example a configuration management device having a configuration management database, which manages, as configuration items (CI), privileges provided on resources in addition to resources, personnel, and processes in the service management, as an example of an information processor for managing privileges to be given to personnel to whom processes are assigned.

Figure 1:
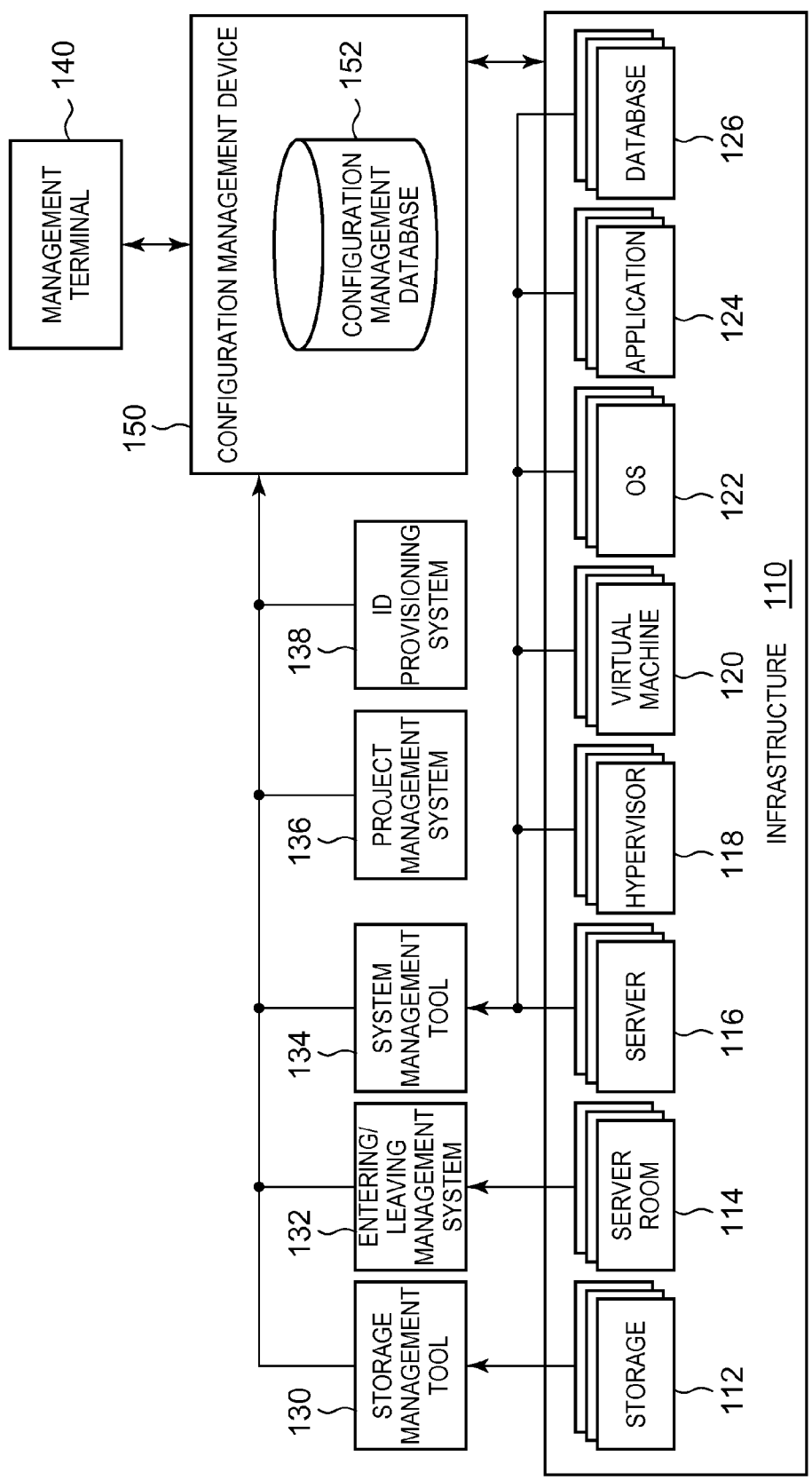
FIG. 1 is a diagram illustrating a schematic configuration of a system including a configuration management device according to an embodiment of the present invention.

Hereinafter, with reference to FIG. 1, the general configuration of a system according to an embodiment of the present invention will be described. FIG. 1 is a diagram illustrating a schematic configuration of a system including a configuration management device according to the embodiment of the present invention. A system 100 illustrated in FIG. 1 includes an infrastructure 110 formed of various resources for providing IT services. The infrastructure 110 is allowed to include any components that can be targets of service management and the components are not particularly limited. The infrastructure 110 can include, for example, a storage 112 such as a storage area network (SAN) or a network attached storage (NAS), a server room 114, a server 116, a hypervisor 118, a virtual machine 120, an operating system (hereinafter, referred to as OS) 122, an application 124, and a database 126. In addition, the infrastructure 110 may include client terminals such as a personal computer and a portable terminal and networking equipment such as a hub, a switch, and a router, which are not shown.

A configuration management device 150 includes a configuration management database 152 which performs configuration management with information on components to be targets of service management in the system 100 integrated. The configuration management database 152 stores configuration items (CI) and the details of their important attributes and also stores relations between configuration items.

The configuration item (CI) means a basic unit to be managed in IT service management. In the embodiment of the present invention, the configuration items include resources, processes, personnel, and privileges provided on the resources. The configuration management database 152 according to the embodiment of the present invention enables management of the state of privileges given to personnel, to whom processes are assigned, by managing the privileges provided on the resources in addition to the resources, the personnel, and the processes.

The "resource" of the aforementioned configuration items (hereinafter, the "resource" configuration item is referred to as a resource CI) may include hardware resources such as the storage 112, the server 116, and further the client terminals and the networking equipment described above, software resources such as the hypervisor 118, the virtual machine 120, the OS 122, the application 124, and the database 126, and institutions or facilities such as the server room 114 and further floors and buildings.

While the human resource can be included in the concept of a resource, the term "resource" in this specification mainly means a tangible or intangible material resource such as hardware, software, facilities, an institution, and the human resource is assumed to be included in the concept of "personnel" described later. In addition, the concept of "resource" may include documents or the like, such as a rulebook on IT service management, a work procedure manual, and a configuration diagram, and maintenance information such as an incident history.

The "personnel" of the aforementioned configuration items (hereinafter, the "personnel" configuration item is referred to as a personnel CI) means human resources involved in service management and is to be a subject to which a process described later is assigned to perform the process. The personnel can include an individual, a group formed by a collection of individuals, and a role representing an individual having a specific task or a job title. The "process" of the aforementioned configuration items (hereinafter, the process configuration item is referred to as a process CI) means a work unit or a processing unit assigned to personnel and is also referred to as a task or a project. The granularity of the process is not particularly limited, but the process may include other processes like subprojects constituting a project or procedures in a workflow. As an example of the process, there is a response to a service request, maintenance, or patch application.

The "privilege" of the aforementioned configuration items (hereinafter, the privilege configuration items is referred to as a privilege CI) is a privilege provided on the aforementioned resource and represents a mode of use or a range of use permitted in the resource. The aforementioned "privilege" includes, for example, a chief administrator privilege and a privilege to enter the room as the privileges on the resource of a type "server room." As the privilege on the resource of a type "server," there is an administrative privilege or a user privilege. The administrative privilege on the resource of the type "server" means a privilege by which the use of the server is permitted in the mode and range including various changes in system setting.

Attributes are associated with the configuration items as described above. The attributes of the configuration items identify and give account of individual configuration items. The attributes are not particularly limited, but may include the name of a configuration item (server, hypervisor, virtual machine, OS, or the like), an identification number (a serial number or a universally unique identifier (UUID)), a category (hardware, software, facilities, a document or the like), a type (described in further detail on the classification in the category), and others such as a mode number, a warranty period, a version number, a location, a chief owner, a date of commencement, a supplier, a license, a providing date, an acceptance date, a start date of use, and a status.

As described above, a relation is defined between configuration items. The relation represents a dependence relation between configuration items. The relation is not particularly limited, but includes assigns, canConnect, canUse, connectAt, connects, controls, deployedOn, Located, Managed, Owned, provides, runAt, uses, usedBy, and the like.

The registration of the configuration items in the configuration management database 152, the input of attributes of configuration items, and the input of relations between configuration items described above can be performed by manual operations on, for example, the management terminal 140. If all of them are performed by manual inputs, however, workload increases drastically with an increase in the components to be managed and it is difficult to update the records so as to be adapted to changes in environment. Therefore, it is not realistic. Accordingly, the configuration management device 150 has so-called discovery and tracking functions.

The aforementioned discovery function continuously and automatically discovers the aforementioned configuration items, collects information on the discovered configuration items, and constructs the configuration management database 152. Similarly to the discovery function, the tracking function continuously and automatically collects information on the aforementioned configuration items, tracks changes in environment, registers new configuration items discovered anew in the configuration management database 152, and updates configuration items having been changed.

The method of discovering configuration items and collecting information on the discovered configuration items in the above function depends on the target configuration items and is not particularly limited, but can include an agent-based search method using a local agent and a sensor-based search method not using any local agent. In terms of reducing the load on the resource to be searched for or reducing the work burden at installation, the sensor-based search method not requiring installation of a local agent on the other node is able to be preferably used. The discovery function and the tracking function enable the components 112 to 126 in the infrastructure 110 to be automatically registered in the configuration management database 152 and updated therein without applying human work load.

The method of supporting the construction of the aforementioned configuration management database 152 is not limited to the above discovery function and tracking function, but the configuration management device 150 may have a linkage function of discovering the configuration items and collecting information thereon by a linkage with the operations management tool, which is installed externally or on the same device, or a groupware server.

According to the aforementioned linkage function, the configuration management device 150 is able to register a resource CI and other related CIs by a linkage with a storage management tool 130 managing the storage 112, an entering/leaving management system 132 managing the entering and leaving into and from the server room 114, a system management tool 134 managing system resources 116 to 126, and the like. Moreover, the configuration management device 150 is able to register the above process CI and other related CIs by a linkage with a project management system 136 and a schedule management system, which is not shown, and to register personnel CI and other related CIs by a linkage with a user management system such as the entering/leaving management system 132, the project management system 136, an ID provisioning system 138, or a lightweight directory access protocol (LDAP) server, which is not shown. The above discovery function and tracking function and the configuration items registered with the linkage function are able to be modified and deleted appropriately by manual operations on the management terminal 140.

The configuration management device 150 is not particularly limited, but is formed as a computer system made of one or more computers and generally formed as a desktop system, a workstation, a server, a middle-range computer, or a general-purpose computer device such as a mainframe. The configuration management device 150 includes a central processing unit (CPU), a random access memory (RAM), a storage device such as a hard disk drive (HDD) or a solid state drive (SSD), and a network interface card (NIC), which are not shown, and runs under the control of an OS such as Windows®, UNIX®, AIX®, or Linux®.

Figure 2:
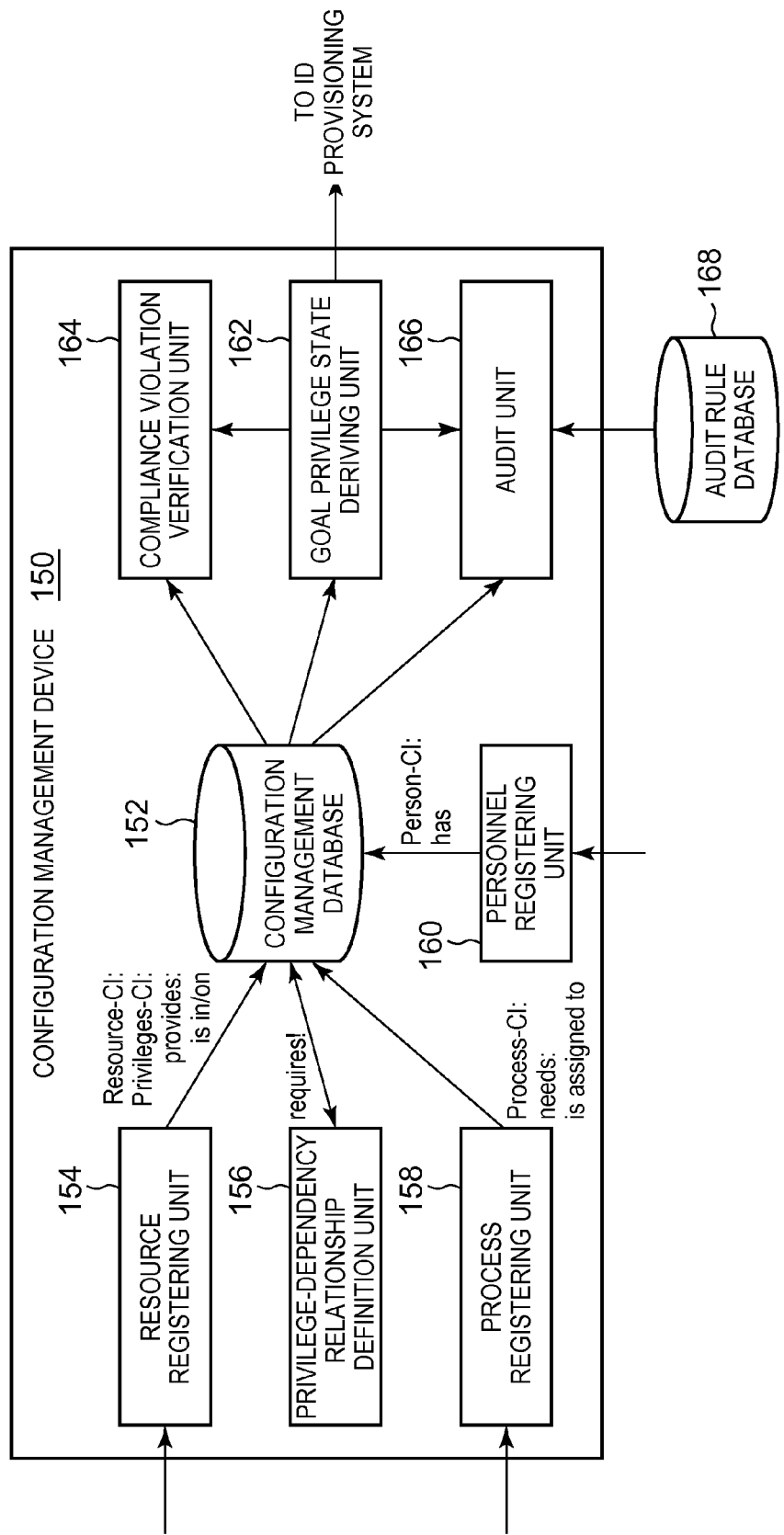
FIG. 2 is a functional block diagram implemented on the configuration management device according to the embodiment of the present invention.
Figure 3:
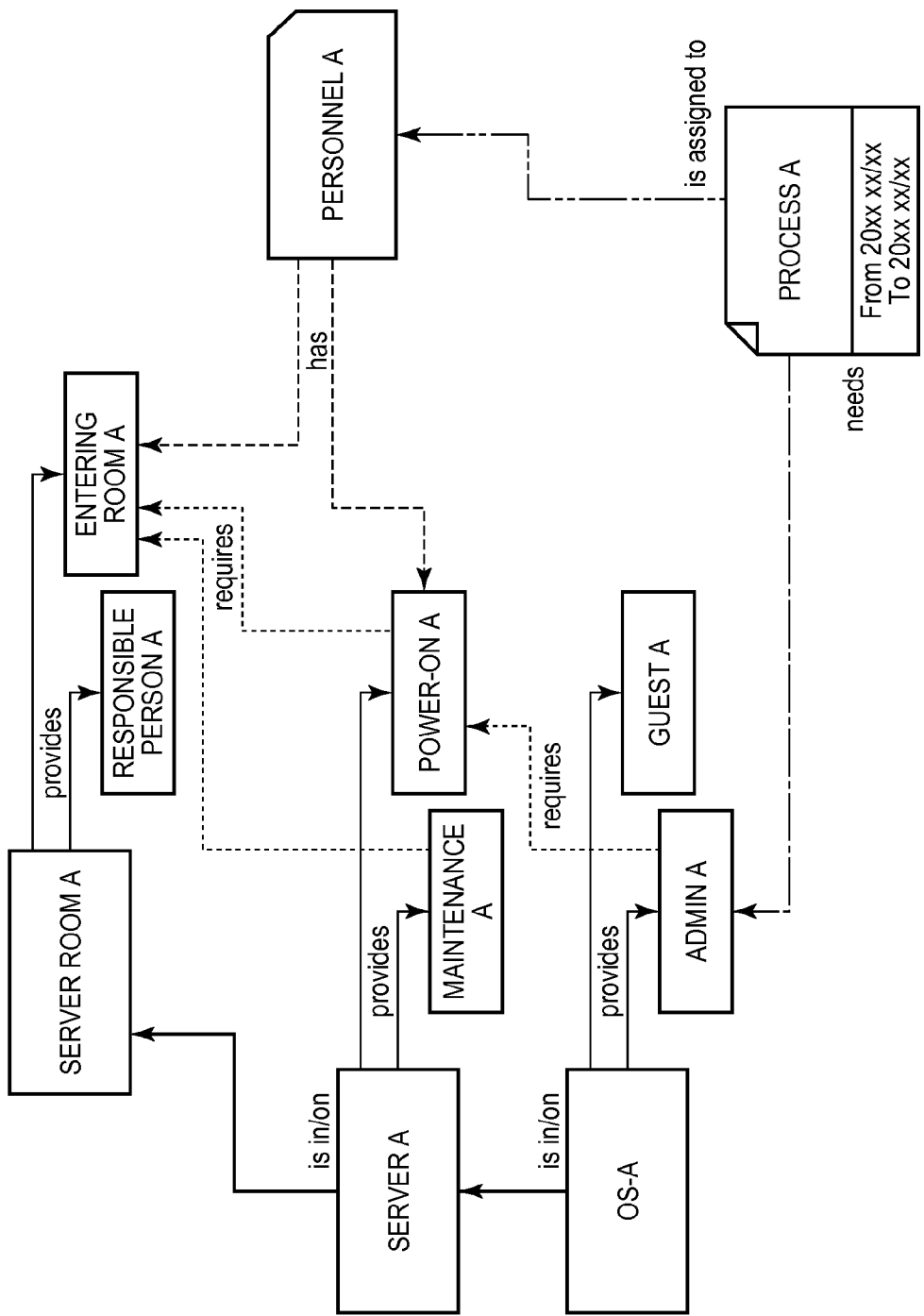
FIG. 3 is a schematic diagram illustrating a relation between configuration items in a configuration management database, which is constructed by a resource registering unit, a privilege-dependency relationship definition unit, a process registering unit, and a personnel registering unit.

FIG. 2 is a functional block diagram implemented on the configuration management device according to the embodiment of the present invention. The functional block of the configuration management device 150 illustrated in FIG. 2 includes, as functional units for constructing and updating the configuration management database 152, a resource registering unit 154, a privilege-dependency relationship definition unit 156, a process registering unit 158, and a personnel registering unit 160. FIG. 3 is a diagram schematically illustrating a relation between configuration items in the configuration management database 152, which is constructed by the resource registering unit 154, the privilege-dependency relationship definition unit 156, the process registering unit 158, and the personnel registering unit 160.

The resource registering unit 154 has a function of obtaining information related to various resources by manual input, a linkage with an external tool, or automatic detection using the discovery or tracking function and further creating and updating instances of a resource CI and other related CIs (substantial data of a CI is referred to as an instance) in the configuration management database 152 (FIG. 3). In the case where the manual input is performed, the resource registering unit 154 communicates with a management tool or a browser on the management terminal 140, receives data related to a resource in a predetermined format transmitted from the management terminal 140, and creates or updates a CI instance according to the obtained information.

In the case where the linkage with an external tool or the like is performed, the resource registering unit 154 communicates with the storage management tool 130, the entering/leaving management system 132, or the system management tool 134, receives data related to a resource from the other node, performs an appropriate format conversion, and creates or updates a CI instance according to the obtained information.

In the case of the automatic detection using the above discovery or tracking function, the resource registering unit 154 is able to use a discovery engine as described below, for example, when using the sensor-based search method. The discovery engine previously has settings of an IP address range, a search scope of a subnet address or a specific IP address, an access list identifying qualification information for use in discovering a component and inquiring of the component about appropriate configuration information or a dependence relation, and a schedule. The discovery engine starts processing according to the schedule, which has been set, or at explicitly-specified timing.

The discovery process includes a plurality of steps. The discovery engine first searches a scope, which has been set, by using a standard protocol and identifies an IP node of a device introduced onto the network. Subsequently, the discovery engine starts a sensor to discover a component by matching with a signature of a predetermined reference model and makes a classification, with respect to each of valid IP nodes.

The sensor subsequently inquires of the component about the configuration information and the dependence relation of the component.

Additionally describing the privilege provided on the resource, the configuration information obtained as result of the inquiry can include information on the privilege provided on the component in this embodiment of the present invention. For example, with respect to a resource in which privilege information is able to be obtained in an access control list (ACL) format or the like such as the OS 122, the application 124, or the middleware, a privilege CI is able to be registered on the basis of the obtained privilege information. Moreover, in the case of a physical resource such as the server room 114 or the server 116, a privilege CI is able to be automatically added by using a template previously defined according to a resource class (a category or a model).

The discovery process is iteratively performed until the search of the entire search scope of the infrastructure 110 is completed. In the case of a sensor started for a certain component, further a sensor for detecting other components on the component is able to be started. For example, if a server is detected, a sensor for discovering an application and a service on the server is able to be started.

Moreover, it is also possible to detect a relation between software resources operating on different hardware resources, like a relation between a web application and a database, for example, by obtaining information on a TCP connection established on a component. After the search of the entire search scope of the infrastructure 110, the discovery engine registers the data obtained from the component in the configuration management database 152.

Through the discovery process described above, attribute information on the resource, another resource operating on the resource and a relation between the resources, and a privilege provided by the resource and a relation therebetween are obtained, and the corresponding CI instances are created or updated in the configuration management database 152.

As illustrated in FIG. 3, the resource registering unit 154 creates resource CI instances ("server room A," "server A," and "OS-A") and privilege CI instances ("responsible person A," "entering room A," "maintenance A," "power-on A," "administrator A (abbreviated to admin A in the diagram)," and "guest A") in the configuration management database 152. Further, a relation ("is in/on") may be defined between a resource CI instance and other resource CI instances. As illustrated in the relation between the "server room A" and the "server A" and the relation between the "server A" and the "OS-A" in FIG. 3, the relation ("is in/on") represents the belonging of a resource and, as a matter of convenience, it is referred to as a belonging relation ("is in/on"). Although the belonging relation ("is in/on") will be described as one representing the above "deployed On," "Located," or "run At" relation, the relation is not particularly limited thereto.

Moreover, a relation ("provides") is also defined between a resource CI instance and a privilege CI instance. The relation defined between the resource CI and the privilege CI on a resource represents a relation between a resource and a privilege provided on the resource as illustrated in FIG. 3 by the relation between the "server room A" and the "responsible person A" or "entering room A" and the relation between the "server A" and the "maintenance A" or "power-on A" and, as a matter of convenience, it is referred to as a privilege providing relation ("provides").

Describing the embodiment with reference to FIG. 2 again, the process registering unit 158 has a function of obtaining information on a process such as a task or a project by manual input or by a linkage with an external tool or the like and further creating or updating a process CI instance in the configuration management database 152 (FIG. 3). In the case of the manual input, the process registering unit 158 communicates with a management tool or a browser on the management terminal 140, receives data transmitted from the management terminal 140, and creates, updates, or deletes a process CI instance according to the obtained information.

In the case of the linkage with an external tool or the like, the process registering unit 158 communicates with the project management system 136 or the schedule management system, receives data related to the project or task from the other node, performs an appropriate format conversion, and creates, updates, or deletes a CI instance according to the obtained information.

The information related to a process may include the name of a task or a project, the time limit or time period, description, a person in charge, related resources, and a required privilege on a resource. For a process, a privilege on a resource required for a work of the process can be specified. From this information, a relation is defined between the process CI and the privilege CI on the resource (FIG. 3) and the relation is referred to as a privilege-request relationship ("needs") for convenience. For example, as illustrated in FIG. 3, the privilege of the "administrator A" on the "OS-A" is required to execute the "process A" in which a patch is applied to the "OS-A" and therefore a privilege-request relationship (needs) is defined between the process CI instance "process A" and the privilege CI instance "administrator A."

Moreover, while personnel in charge is not determined in some processes, personnel in charge of performing the work of the process is able to be specified as described above (FIG. 3). The relation defined between the process CI and the personnel CI is referred to as an assignment relation ("is assigned to") for convenience. For example, as illustrated in FIG. 3, the "process A" in which a patch is applied to the "OS-A" is assigned to the "personnel A" and an assignment relation (is assigned to) is defined between the process CI instance "process A" and the personnel CI instance "personnel A."

Similarly to the process registering unit 158, the personnel registering unit 160 has a function of obtaining information related to human resources such as an individual, a group, and a role by manual input or by a linkage with an external tool or the like and further creating or updating a personnel CI instance in the configuration management database 152 (FIG. 3). In the case of the manual input, the personnel registering unit 160 communicates with a management tool or a browser on the management terminal 140, receives data transmitted from the management terminal 140, and creates or updates a personnel CI instance according to the obtained information. In the case of the linkage with an external tool or the like, the personnel registering unit 160 communicates with the entering/leaving management system 132, the project management system 136, the ID provisioning system 138, or the LDAP server, receives data related to the human resources from the other node, performs an appropriate format conversion, and creates or updates a CI instance according to the obtained information.

The information related to the human resources may include the name of an individual, a group, or a role, the description thereof, one or more individuals belonging to a group in the case of a group, and a given privilege on a resource. In this embodiment, a privilege on a resource can be given to the personnel (FIG. 3) and the relation defined between the personnel CI and the privilege CI on the resource is referred to as a privilege-giving relationship ("has") for convenience. For example, as illustrated in FIG. 3, the "personnel A" is given a privilege to enter the "server room A" ("entering room A") and a privilege to turn on power of the "server A" ("power-on A") and further a privilege-giving relationship (has) is defined between the personnel CI instance "personnel A" and the privilege CI instance "entering room A" and between the "personnel A" and "power-on A."

The configuration management device 150 of this embodiment has the privilege-dependency relationship definition unit 156 as described above. The privilege-dependency relationship definition unit 156 has preferably a function of automatically extracting and defining a relation between a privilege CI instance on a resource and privilege CI instances on another resource as automatic detection using the discovery function (tracking function) (FIG. 3). The relation defined between the privilege CI instances on the resources is a relation representing the privilege on another resource required to exercise the privilege on a certain resource, and it is referred to as a privilege-dependency relationship ("requires") for convenience. For example, as illustrated in FIG. 3, a person requires at least a privilege to enter a server room, unless he/she is allowed to perform remote operation, in order to exercise the privilege to turn on the power of the server installed in a certain server room or the maintenance privilege. The privilege-dependency relationship represents the dependence relation of the privileges between resources.

The extraction of the privilege-dependency relationship between a privilege CI instance on a resource and a privilege CI instance on another resource is able to be conditioned, for example, by previously setting a condition which should be referenced at the time of defining a relation ("is in/on" or the like) from another resource CI (hereinafter, the condition is referred to as a privilege-dependency relationship prescribing condition). The previous setting of the privilege-dependency relationship prescribing condition is not particularly limited, but the previous setting is able to be performed by using a template set for the resource CI of a specific class (category or model) or directly for a specific resource CI instance. Moreover, the privilege-dependency relationship prescribing condition prescribes how the privilege CI instance on the resource is related to the privilege CI instance on another resource and the conditioning can be made according to a type of another resource CI instance, the attribute thereof, and a relation between resources.

Figure 5:
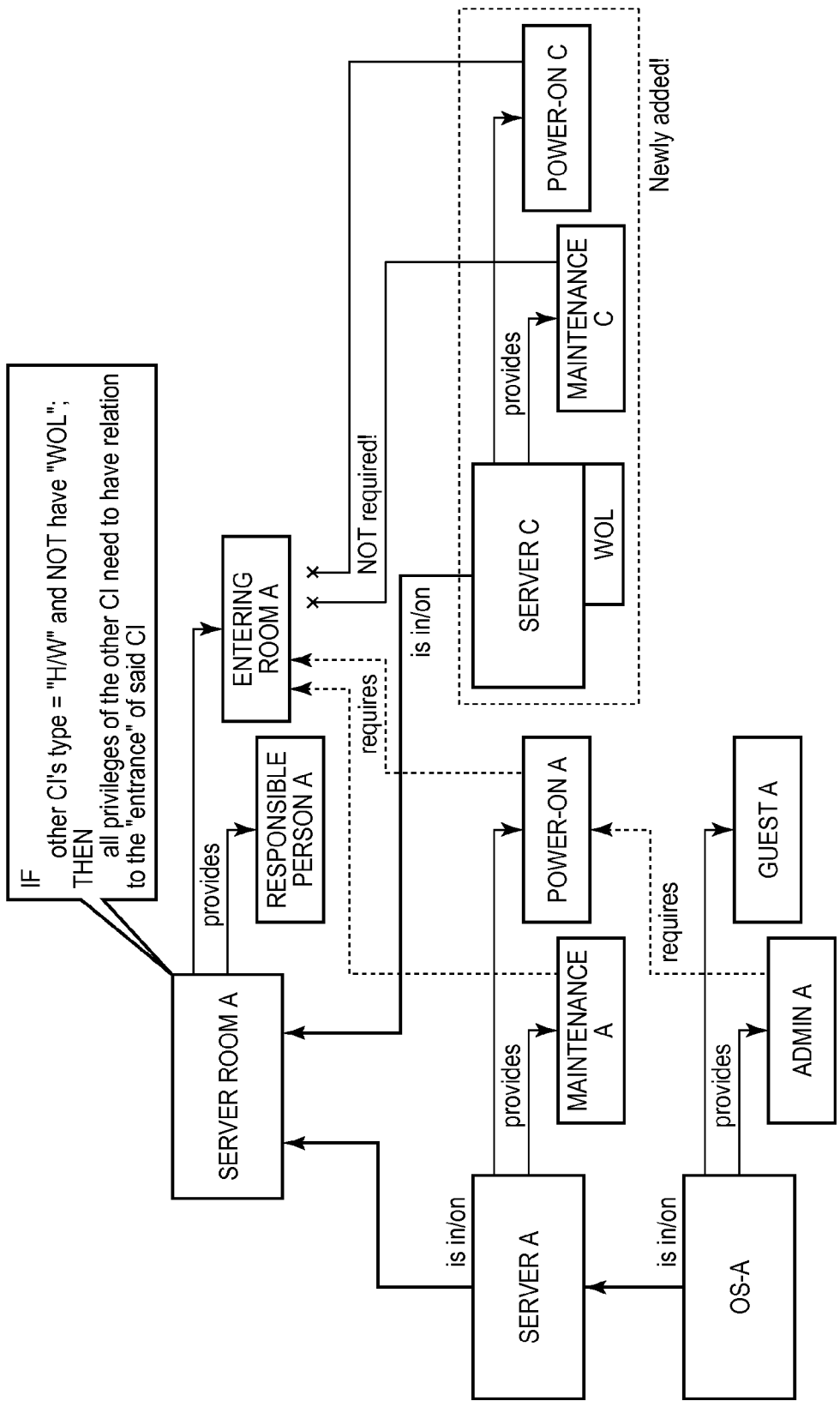
FIG. 5 is a diagram illustrating privilege-dependency relationship extraction processing, which is performed in the case where a new belonging relation between a resource and an existing resource is detected.

FIG. 5 is a diagram illustrating privilege-dependency relationship extraction processing, which is performed in the case where a new belonging relation ("is in/on") is detected between a resource and an existing resource. This new belonging relation is detected when a new resource is added to an existing resource or when a relation is defined anew between the existing resource and another existing resource. In the example shown in FIG. 5, the privilege-dependency relationship prescribing condition is set for an existing resource CI instance "server room A" superordinate in the belonging relation ("is in/on").

The privilege-dependency relationship prescribing condition of the example shown in FIG. 5 prescribes that, when the CI instance of the type "hardware (H/W)" is related to the instance "server room A" and the CI instance of the type "hardware" does not have an attribute value "Wake on LAN (WOL)," the privilege-dependency relationship to the privilege CI instance "entering room A" on the "server room A" should be defined for all the privilege CI instances on the hardware type resource. According to this prescription, the privilege-dependency relationship ("requires") to the privilege CI instance "entering room A" on the "server room A" is defined for the privilege CI instances "maintenance A" and "power-on A" on the "server A."

Moreover, FIG. 5 shows a situation where the CI instance "server C" is added anew to the CI instance "server room A." The CI instance "server C" has its attribute value "WOL" and therefore is able to start the "server C" remotely. For this reason, the privilege-dependency relationship to the privilege CI instance "entering room A" on the "server room A" is not defined for the privilege CI instances "maintenance C" and "power-on C" on the "server C."

In this manner, in the case where one or more resources are associated with an existing resource, the privilege-dependency relationship definition unit 156 references the privilege-dependency relationship prescribing condition that prescribes how the existing resource is related to other resources. The privilege-dependency relationship definition unit 156 subsequently extracts and defines a privilege-dependency relationship which should be made between the privilege on the existing resource and the privileges on one or more respective resources according to the privilege-dependency relationship prescribing condition. This function is able to significantly reduce human labor particularly when the same type of a large number of resources are added.

Figure 6:
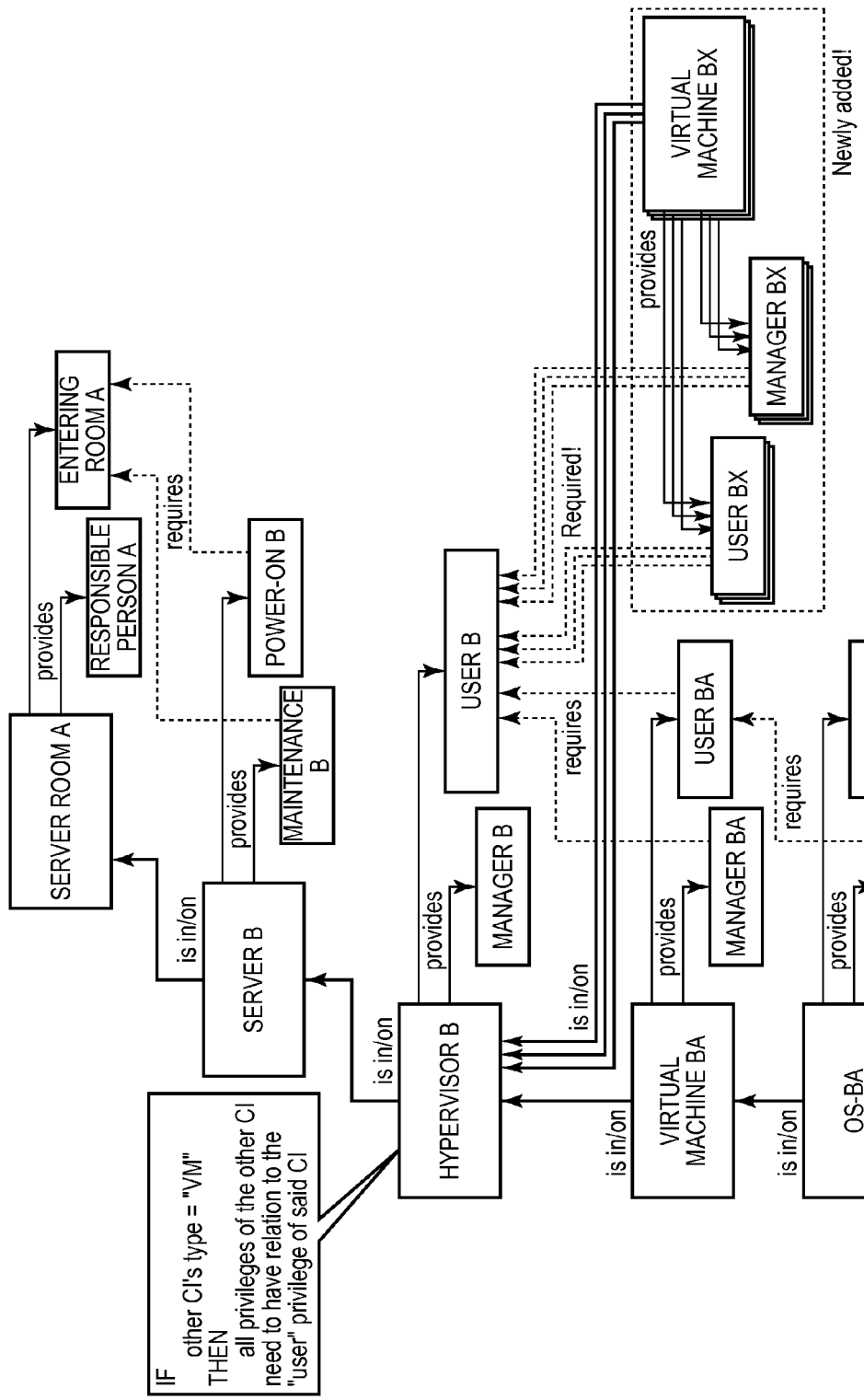
FIG. 6 is a diagram illustrating privilege-dependency relationship extraction processing, which is performed in the case where one or more new resources are added to an existing resource.
Figure 7:
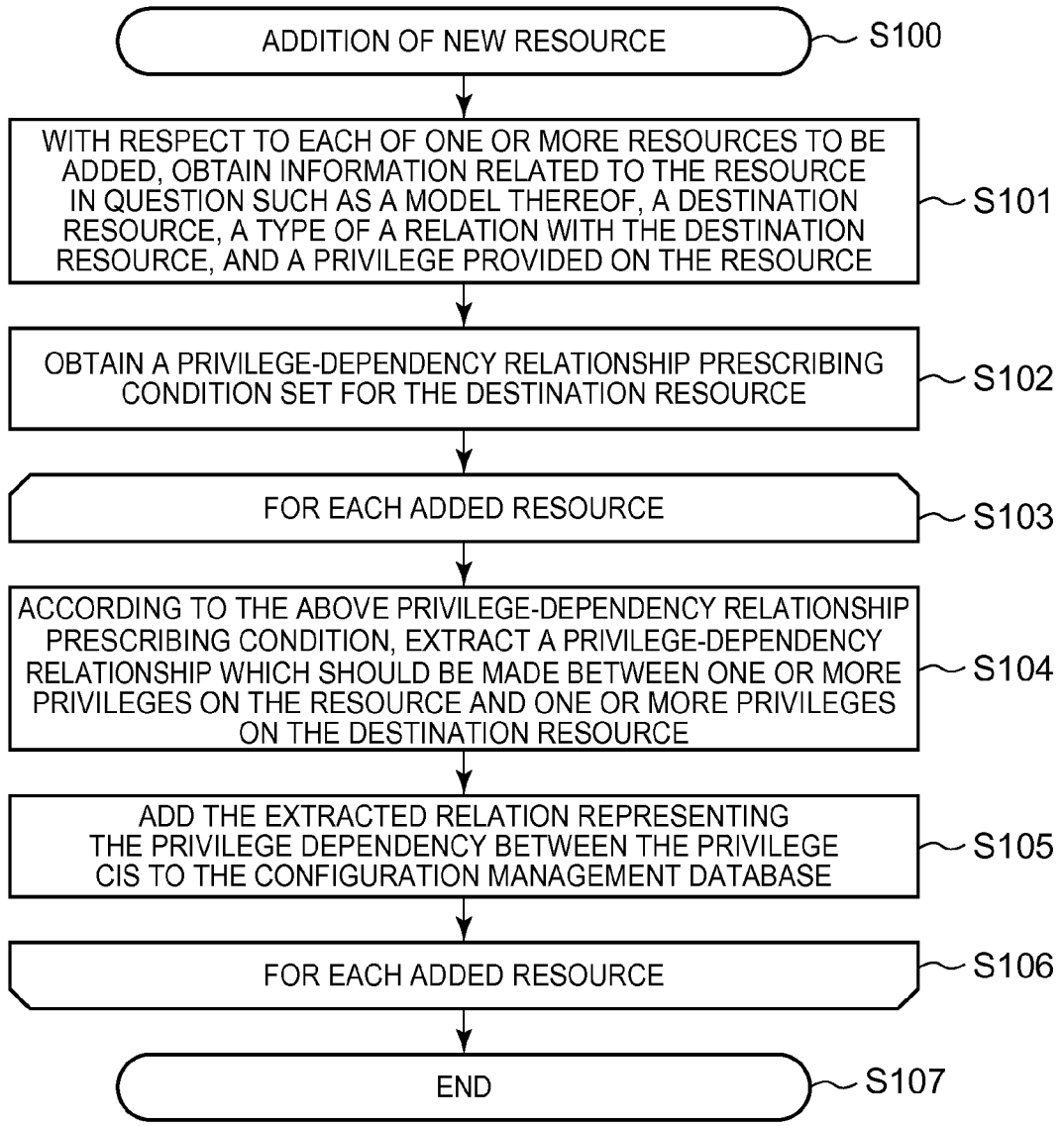
FIG. 7 is a flowchart illustrating privilege-dependency relationship extraction processing, which is performed by the configuration management device according to an embodiment of the present invention.

Hereinafter, with reference to FIG. 6 and FIG. 7, the privilege-dependency relationship extraction processing will be described in more detail. FIG. 6 is a diagram illustrating privilege-dependency relationship extraction processing, which is performed in the case where one or more new resources are added to an existing resource. FIG. 7 is a flowchart illustrating privilege-dependency relationship extraction processing, which is performed by the configuration management device according to the embodiment of the present invention.

The processing illustrated in FIG. 7 is started in step S100 in response to that one or more new resources are added. The example in FIG. 6 illustrates that the resource registering unit 154 added a plurality of resource CI instances "virtual machine BX" in association with the resource CI instance "hypervisor B" in the configuration management database 152 in response to the addition of one or more new resources described above. Similarly, the privilege CI instances "user BX" and "manager BX" on the "virtual machine BX" are also added.

In step S101, with respect to each of one or more resources to be added, the privilege-dependency relationship definition unit 156 obtains information related to the resource in question, such as a model thereof, an existing resource of a destination, a type of a relation with the destination resource, and a privilege provided on the resource. In the example shown in FIG. 6, the CI instance of one or more resources to be added is of a type "virtual machine" and the destination is a CI instance "hypervisor B." In step S102, the privilege-dependency relationship definition unit 156 obtains a privilege-dependency relationship prescribing condition which is set for the destination resource. The privilege-dependency relationship prescribing condition shown in FIG. 6 prescribes that the privilege-dependency relationship to the privilege CI instance "user B" on the "hypervisor B" should be defined for all privilege CI instances on the virtual machine type resource in the case where the resource CI instance of the type "virtual machine" is related to the instance "hypervisor B."

In the loop of steps S103 to S106, processing of step S104 and step S105 is performed for each of one or more resources to be added. In step S104, a privilege-dependency relationship (requires), which should be made between one or more privileges on the resource and one or more privileges on the destination resource, is extracted according to the aforementioned privilege-dependency relationship prescribing condition.

In step S105, the extracted privilege-dependency relationship between the privilege CI instances is added to the configuration management database 152. In the example shown in FIG. 6, there is extracted a privilege-dependency relationship, which should be formed between the privilege CI instances "manager BX" and "user BX" on each "virtual machine BX" and the privilege CI instance "user B" on the "hypervisor B," and the instances are collectively defined in the configuration management database 152. After the control exits from the loop of steps S103 to S106, this processing ends in step S107.

As described above, according to the aforementioned privilege-dependency relationship extraction processing, an appropriate privilege-dependency relationship is defined between one or more new resources and an existing resource in response to that one or more new resources are added to the existing resource. Therefore, the privilege-dependency relationship is able to be efficiently defined even if the same type of resources are added in bulk, thereby significantly reducing human labor. In addition, as is the case with the resource registering unit 154, the privilege-dependency relationship, which has been automatically given, is able to be input or modified manually.

FIG. 4 is a diagram illustrating a data structure of the configuration management database 152 constructed by functional units 154 to 160 for constructing and updating the configuration management database 152. A configuration item table 200 illustrated in FIG. 4 includes a field 202 which stores the names of configuration items, a field 204 which stores the categories of configuration items, a field 206 which stores models obtained by further dividing the aforementioned categories of configuration items, an attribute field 208, and a relation field 210.

The attribute field 208 stores one or more sets of an attribute and an attribute value. The relation field 210 stores information on one or more relations defined for the configuration item in question and stores the type of relation and the name (or an identification number, etc.) for identifying a configuration item of the other end of the configuration item. The data structure shown in FIG. 4 is illustrative only and is not particularly limited. In other embodiments, the content of the relation field 210 may be managed in another table.

In the configuration management device 150 according to the embodiment of the present invention, the resource registering unit 154, the privilege-dependency relationship definition unit 156, and the process registering unit 158, and the personnel registering unit 160, which are functional units for constructing and updating the configuration management database 152, construct the configuration management database 152, which stores, as CIs, a resource, personnel, a process, and a privilege provided ("provides") on the resource to be targets of service management, thereby providing a base for verifying the consistency of the privilege state given to the personnel described below.

In the constructed configuration management database 152, various relations between CIs are prescribed including a privilege-dependency relationship ("requires") between a privilege on a resource and a privilege on another resource required to exercise the privilege, a privilege-request relationship ("needs") between a process and a privilege required for the process, and a privilege-giving relationship ("has") between personnel and a privilege given to the personnel. As described above, it is also possible to grasp the relations between the CIs, which have been constructed in the configuration management device 150, as a graph by visualization, for example, as disclosed in Non-patent Document 1.

The following describes a function of managing privileges to be given to personnel to whom processes are assigned by using the configuration management database 152. As described above, one or more processes to be executed are able to be assigned to personnel in this system. Moreover, a privilege on a resource may be required to execute each process. For example, as illustrated in FIG. 3, an administrative privilege "administrator A" on a resource "OS-A" is required to execute the "process A" for applying a patch to the "OS-A." Therefore, "personnel A" is not able to perform "process A" unless at least the privilege of the "administrator A" on the "OS-A" is given to the "personnel A" to whom the "process A" is assigned. Consequently, it is necessary to give at least the privilege of the "administrator A" to the "personnel A."

On the other hand, there is a privilege-dependency relationship between resources as described above, and therefore the "personnel A" is not able to perform the "process A" substantially only by using the privilege of the "administrator A." Specifically, the "administrator A" is related to (requires) the privilege of "power-on A" of the "server A" and "power-on A" is further related to (requires) the privilege of "entering room A" of the "server room A." In other words, it is insufficient to give only the privilege of the "administrator A" to the "personnel A" and it is necessary to give both of the privileges of "power-on A" and "entering room A" to the "personnel A." This kind of relations cannot be easily grasped only from information on processes assigned to personnel, and therefore it is more and more difficult to grasp the relations as resources increases and the hierarchy of the resources gets deeper.

Accordingly, the configuration management device 150 according to the embodiment of the present invention further includes a goal privilege state deriving unit 162, a compliance violation verification unit 164, and an audit unit 166 in addition to the functional units 154 to 160 for constructing and updating the configuration management database 152 as illustrated in FIG. 2.

The goal privilege state deriving unit 162 has a function of deriving an inconsistency between a goal state of a privilege to be given to (has) personnel and the current state by following the relation including the privilege-dependency relationship (requires) with the privilege on the resource required for (needs) a process to be executed used as a reference point, with respect to each of the processes to be executed which is assigned to (is assigned to) the personnel, with reference to the configuration management database 152. Here, the term "goal state" may be a state complying with the principle of the minimum privileges, which is one of the basic concepts, for example, in computer security, in other words, a state in which the minimum privileges are given to the personnel. The goal privilege state deriving unit 162 forms a privilege deriving unit of this embodiment. The processing of deriving the inconsistency is not particularly limited, but is able to be started by detecting periodic, irregular, or specified timing and an addition of a new process or by detecting the completion of an existent process (which means an unfinished process) or the end of a period.

The compliance violation verification unit 164 verifies whether the compliance to be observed is violated with respect to a relation set between a privilege on a resource and one or more persons (personnel) as a result of eliminating the inconsistency derived from judgment based on the privilege-dependency relationship by the goal privilege state deriving unit 162. The compliance includes rules to be observed according to this embodiment and the compliance violation verification unit 164 includes a rule violation detecting unit according to this embodiment.

The audit unit 166 conducts an audit to determine whether a predetermined audit rule is not violated as a result of eliminating the inconsistency derived from judgment based on the privilege-dependency relationship. The audit rule is managed in the audit rule database 168 and may include, for example, a duty segregation rule. The duty segregation rule prescribes a combination of privileges which are not permitted to be given to the same personnel between related resources.

Hereinafter, privilege state inconsistency detection processing by the goal privilege state deriving unit 162, compliance violation verification processing by the compliance violation verification unit 164, and audit processing by the audit unit 166 will be described in more detail with reference to a conceptual diagram and a flowchart of the configuration management database.

Figure 8:
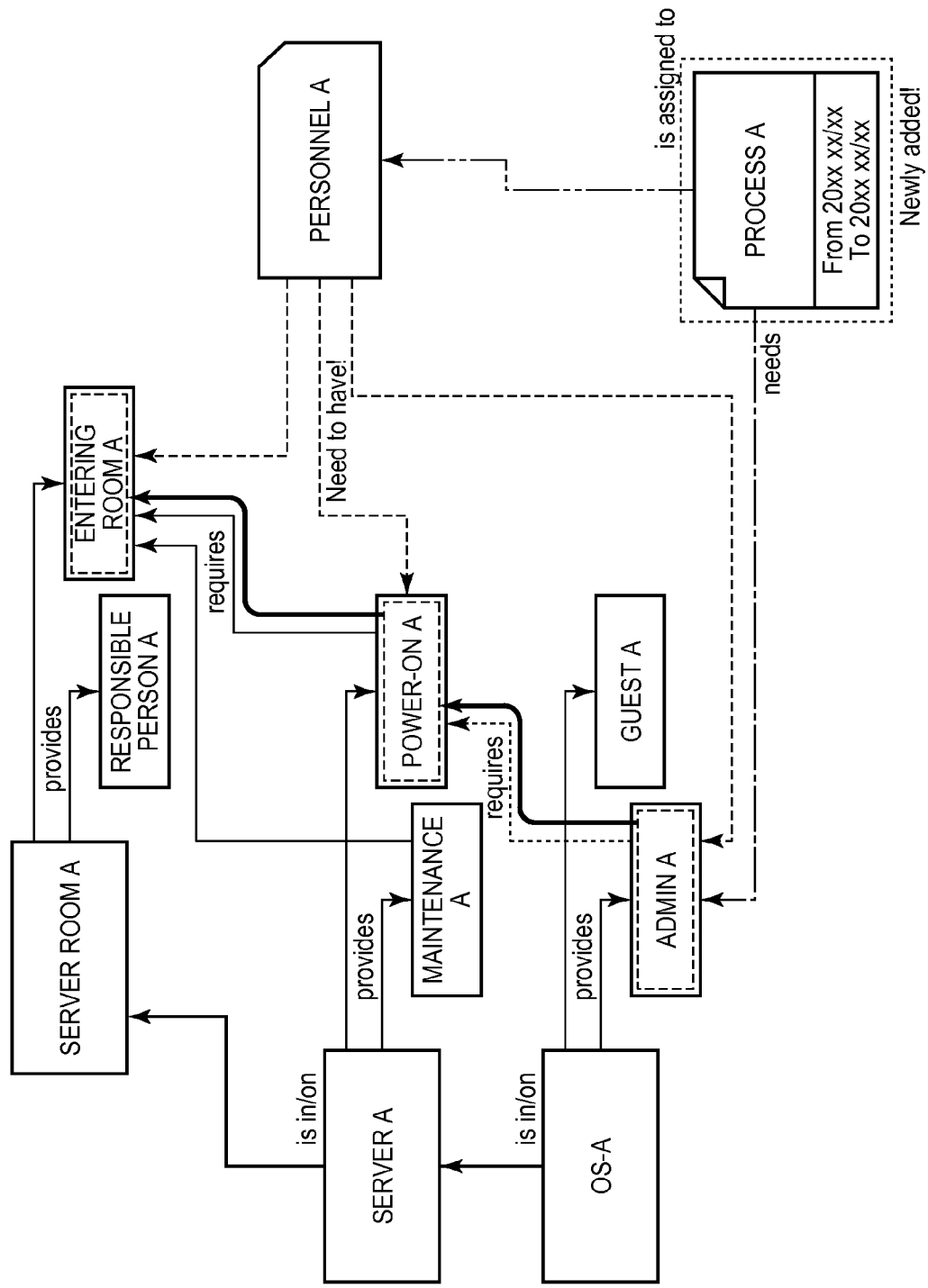
FIG. 8 is a diagram illustrating privilege state inconsistency detection processing, which is performed in the case where a new process is added.
Figure 9:
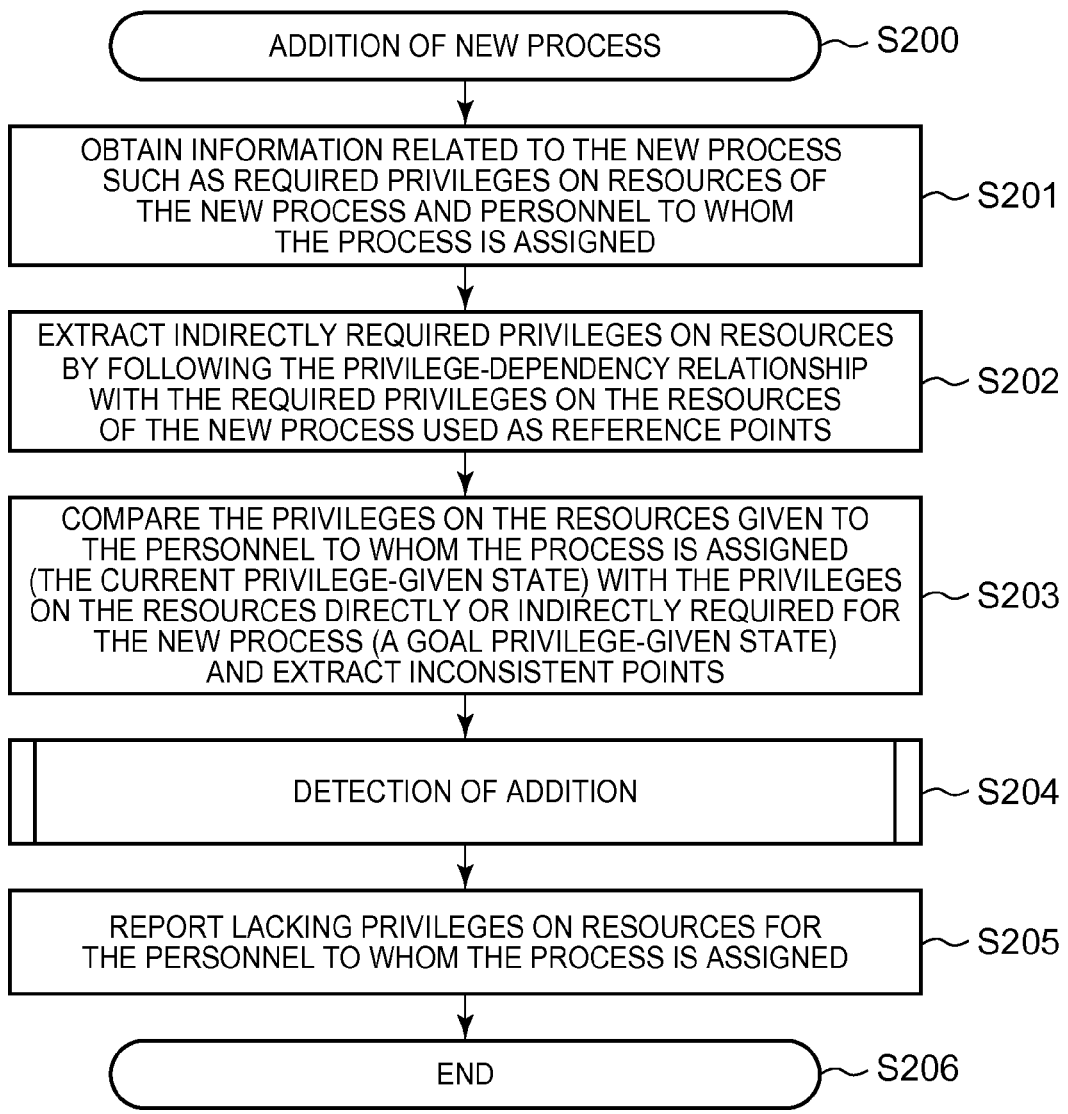
FIG. 9 is a flowchart illustrating privilege state inconsistency detection processing, which is performed by the configuration management device according to an embodiment of the present invention in the case where a new process is added.

FIG. 8 is a diagram illustrating privilege state inconsistency detection processing, which is performed in the case where a new process is added. FIG. 9 is a flowchart illustrating privilege state inconsistency detection processing, which is performed by the configuration management device according to the embodiment of the present invention in the case where a new process is added. The processing shown in FIG. 9 starts in step S200 in response to an addition of a new process. In the example shown in FIG. 8, there is shown that the process registering unit 158 adds the process CI instance "process A" in the configuration management database 152 in response to the above addition of the new process.

In step S201, the goal privilege state deriving unit 162 obtains information related to the new process such as one or more required privileges on resources specified at the registration of the new process and one or more persons (personnel) to whom the process is assigned. In the example shown in FIG. 8, the "process A" requires a privilege of the "administrator A" on the "OS-A" and the "process A" is assigned to the "personnel A."

In step S202, the goal privilege state deriving unit 162 extracts indirectly required privileges on resources by following the privilege-dependency relationship with the required privileges on the resources of the new process used as reference points. In the example shown in FIG. 8, a privilege-dependency relationship exists between the privilege CI instance "administrator A" on the "OS-A" and the privilege CI instance "power-on A" on the "server A" and between the privilege CI instance "power-on A" on the "server A" and the privilege CI instance "entering room A" on the "server room A." Therefore, the relation is followed as indicated by a thick arrow in the diagram, by which the privilege CI instances "power-on A" and "entering room A" are extracted as privileges on the indirectly required resources.

In step S203, the goal privilege state deriving unit 162 compares the current privileges on the resources given to the personnel to whom the process is assigned (the current privilege-given state) with the privileges on the resources directly or indirectly required for the new process (a goal privilege-given state) and extracts inconsistent points. The inconsistent point derived here is a privilege lacking in the current state among the privileges required for the process assigned to the personnel. In the example shown in FIG. 8, with respect to each of the privilege CI instance "entering room A" on the "server room A," the privilege CI instance "power-on A" on the "server A," and the privilege CI instance "administrator A" on the "OS-A," an inconsistent point is derived as a lacking privilege unless the privilege-giving relationship "(has)" is defined for the personnel CI instance "personnel A."

In step S204, processing, which will be described later, is arbitrarily performed by the compliance violation verification unit 164 or the audit unit 166. In step S205, the goal privilege state deriving unit 162 outputs a report to a predetermined manager to give information that the lacking privileges derived as inconsistencies are privileges to be given and then ends this processing in step S206. Upon receiving the report, the manager gives the lacking privileges by using the ID provisioning system 138 or the like, thereby enabling an appropriate privilege state to be maintained. Alternatively, it is also possible to automatically give the lacking privileges derived as inconsistencies by a linkage with the ID provisioning system 138 along with the report output or in place of the report output.

The above has described the privilege state inconsistency detection processing performed in the case where the addition of a new process is detected. When a process is assigned to a person in charge by the aforementioned privilege state inconsistency detection processing, the privilege on the resource in the goal state to be given to the person is able to be derived by following a privilege on a resource required for the process and a privilege on another resource related to the privilege. In addition, in this inconsistency detection processing, not only the personnel related to the new added process, but also the entire structure may be verified on a timely basis when the new process is added. Hereinafter, more description will be made with reference to FIG. 10 and FIG. 11.

Figure 10:
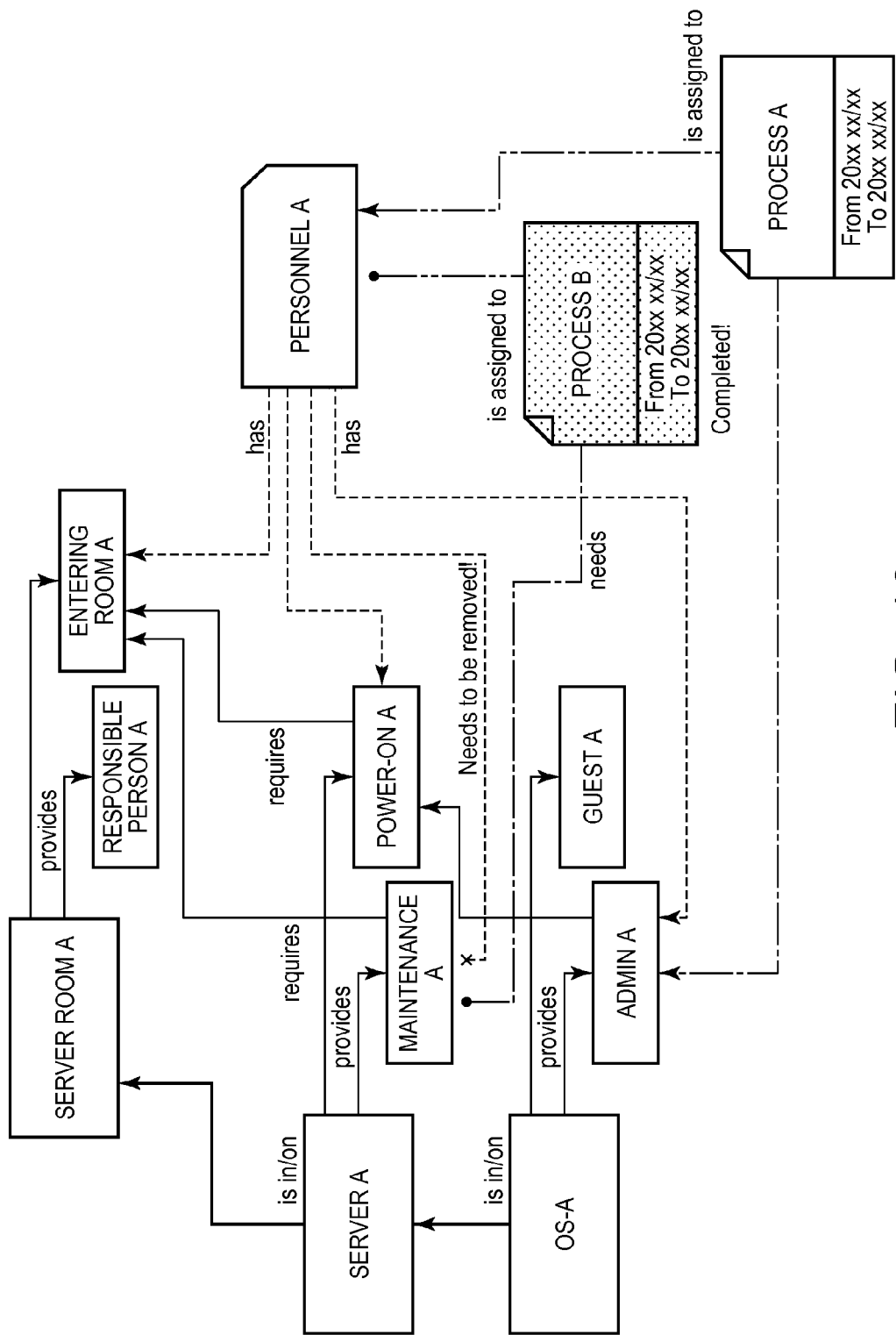
FIG. 10 is a diagram illustrating privilege state inconsistency detection processing with respect to all existent processes.
Figure 11:
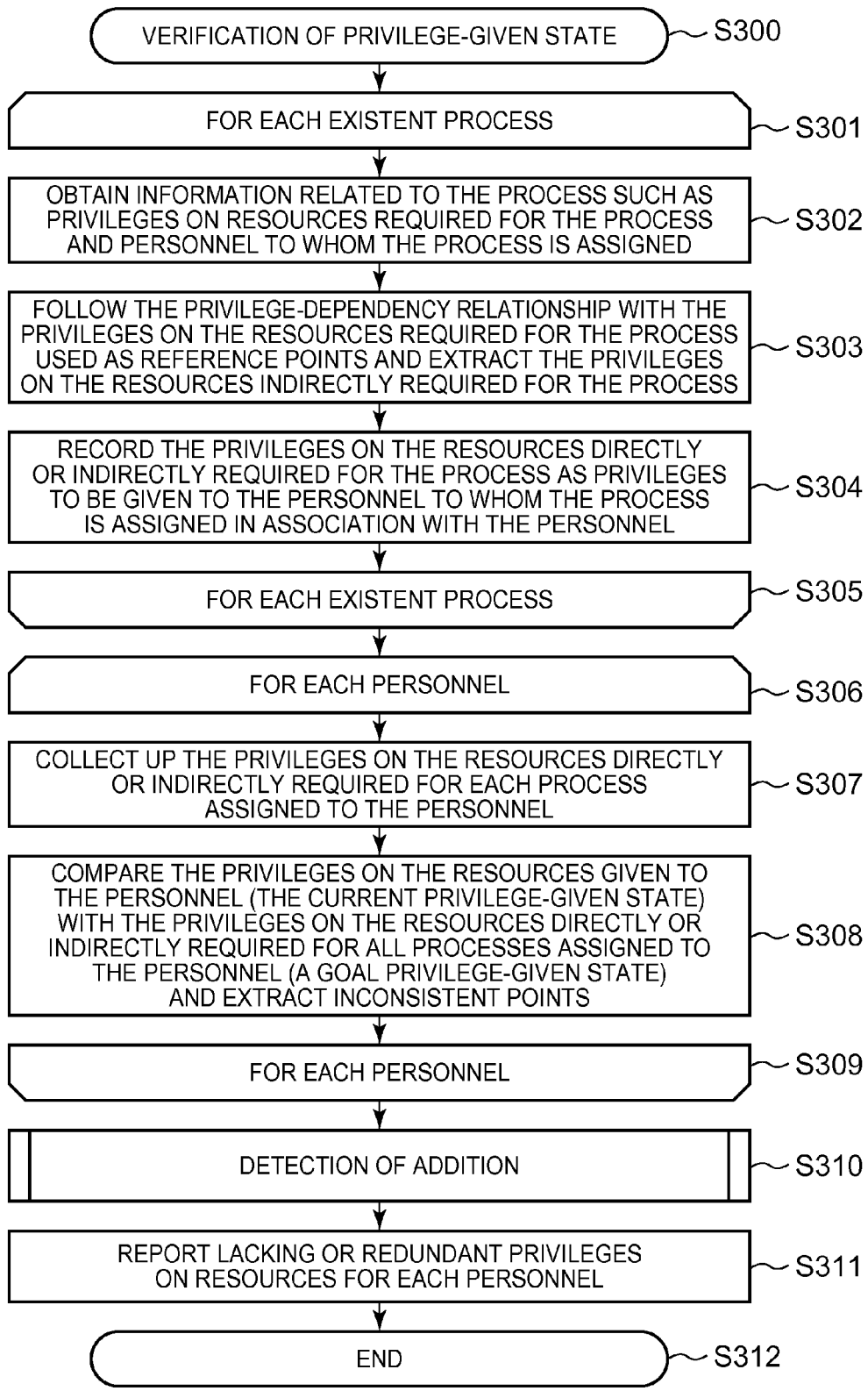
FIG. 11 is a flowchart illustrating privilege state derivation processing, with respect to all existent processes, which is performed by the configuration management device according to an embodiment of the present invention.

FIG. 10 is a diagram illustrating privilege state inconsistency detection processing with respect to all existent processes. FIG. 11 is a flowchart illustrating privilege state derivation processing, with respect to all existent processes, which is performed by the configuration management device according to the embodiment of the present invention. The processing shown in FIG. 11 is started in step S300 in response to regularly or irregularly receiving an explicit instruction from the manager or the like, in response to the completion of an existent process, or in response to the end of a period set for the existent process.

In the example shown in FIG. 10, there is shown that the process registering unit 158 updated the status of the process CI instance "process B" as being "completed" in the configuration management database 152 in response to the completion of the aforementioned existent process. In the loop of steps S301 to S305, processing of steps S302 to S304 is performed for each existent process.

In step S302, the goal privilege state deriving unit 162 obtains information on privileges on resources required for the process and personnel to whom the process is assigned. In the example shown in FIG. 10, the existent "process A" requires the privilege of the "administrator A" on the "OS-A" and the "process A" is assigned to the "personnel A." Therefore, the goal privilege state deriving unit 162 obtains information on the "process A." On the other hand, the "process B" has already been completed and therefore the goal privilege state deriving unit 162 does not obtain the information on the "process B" here.

In step S303, the goal privilege state deriving unit 162 follows the privilege-dependency relationship with the privileges on the resources directly required for the process used as reference points and extracts the privileges on the resources indirectly required for the process. In the example shown in FIG. 10, the privilege CI instances "power-on A" and "entering room A" are extracted as indirectly needed privileges on the resource, as has been in FIG. 8.

In step S304, the goal privilege state deriving unit 162 records the privileges on the resources directly or indirectly required for the process as privileges to be given to the personnel to whom the process is assigned in association with the personnel. In the example shown in FIG. 10, the privilege CI instances "entering room A," the privilege CI instance "power-on A," and the privilege CI instance "administrator A" are recorded in association with the personnel CI instance "personnel A."

After exiting from the loop of steps S301 to S305, the processing proceeds to the loop of steps S306 to S309, and then processing of steps S307 and S308 is performed for each personnel. In step S307, the goal privilege state deriving unit 162 collects up the privileges on the resources directly or indirectly required for each of all processes assigned to the personnel in question for each personnel. In step S308, the goal privilege state deriving unit 162 compares the current privileges on the resources given to the personnel (the current privilege-given state) with the privileges on the resources directly or indirectly required for all processes assigned to the personnel (a goal privilege-given state) and extracts inconsistent points.

The inconsistent point derived here includes a privilege lacking in the current state among the privileges needed to execute all processes assigned to the personnel. Further, the inconsistent point includes privileges redundantly given so as to be more than those needed to execute all processes assigned to the personnel (the minimum privileges) among privileges currently given to the personnel. Although the privilege of the "maintenance A" of the "server A" is temporarily given for the "personnel A" for the completed "process B" in the example shown in FIG. 10, an inconsistent point is derived with the privilege considered to be a redundant privilege.

After exiting from the loop of steps S306 to S309, the compliance violation verification unit 164 or the audit unit 166 arbitrarily performs processing, which will be described in detail later, in step S310. In step S311, the goal privilege state deriving unit 162 outputs a report to a predetermined manager to give information that the lacking privileges derived as inconsistencies are privileges to be given and the redundant privileges are privileges to be removed and then ends this processing in step S312. As for details after outputting the report, the same processing as in the description with reference to FIG. 9 is applicable.

According to the privilege state verification processing described above, the manager is able to grasp the state in which the minimum privileges are given to each personnel according to the principle of minimum privileges, which is one of the basic concepts in computer security. Further, this privilege state can be efficiently achieved by a linkage with the ID provisioning system 138. The principle of minimum privileges, however, sometimes requires the provision of exceptions for other reasons such as compliance and the like. The following describes processing of providing for exceptions of the principle, which is performed by the compliance violation verification unit 164, in more detail.

As described above, the compliance violation verification unit 164 is a functional unit which verifies whether compliance is violated as a result of eliminating a derived inconsistency. The compliance violation verification unit 164 verifies whether compliance is violated as a result of solving the lacking of a privilege by giving the privilege for a lacking privilege, which has been detected to be an inconsistency as a result of determination made from the privilege-dependency relationship by the goal privilege state deriving unit 162. Similarly, with respect to a redundant privilege, which has been detected to be an inconsistency, the compliance violation verification unit 164 verifies whether compliance is violated as a result of solving the redundancy of a privilege by removing the privilege.

As a case where compliance is violated as a result of removing a privilege, there is, for example, a case where compliance is violated if the last person is deleted in a situation where a privilege on a resource needs to be given to at least one person. As a case where compliance is violated as a result of giving a privilege, there is, for example, a case where compliance is violated if a new privilege is given in a situation where the upper limit is imposed on the number of persons to whom privileges are simultaneously given. The compliance violation verification unit 164 detects the above-described violation states.

Figure 12:
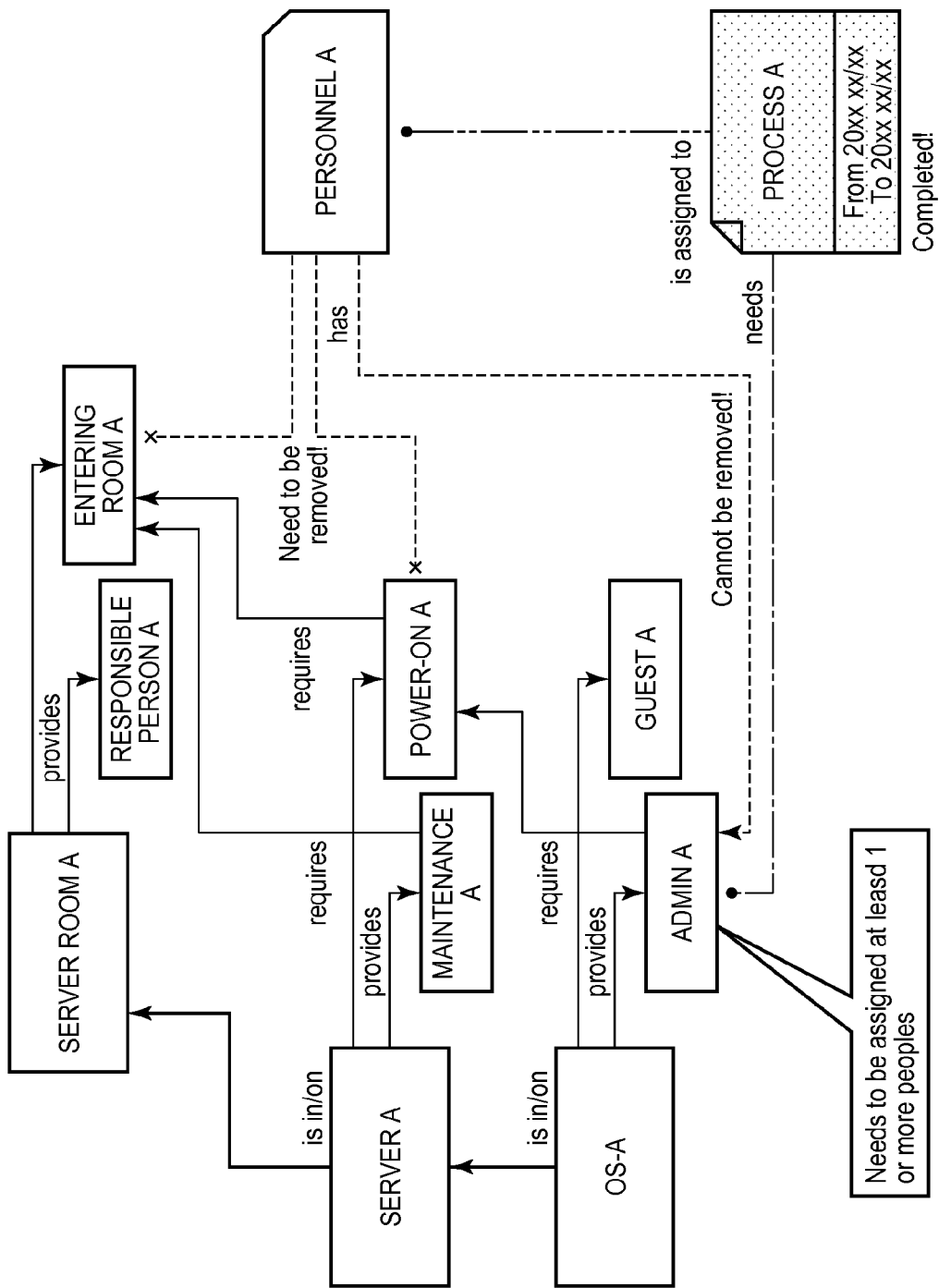
FIG. 12 is a diagram illustrating compliance violation verification processing according to an embodiment of the present invention.

FIG. 12 is a diagram illustrating the compliance violation verification processing. In the example shown in FIG. 12, there is illustrated that the process registering unit 158 updates the status of the process CI instance "process A" is updated to be "completed" in the configuration management database 152 in response to the completion of the aforementioned existent process. In this case, no process requiring the privilege of the "administrator A" on the "OS-A" is assigned to the "personnel A" except the "process A." Therefore, the privilege of the "administrator A" on the "OS-A" is made redundant simultaneously with the completion of the "process A." Accordingly, the aforementioned goal privilege state deriving unit 162 detects the privilege of the "administrator A" on the "OS-A" as a privilege to be removed.

On the other hand, for the privilege of the "administrator A" on the "OS-A," compliance to be observed is set with respect to a relation set between the "administrator A" and personnel, for example, as attribute information. According to the compliance shown in FIG. 12, at least one person (personnel) needs to be assigned to the "administrator A." Therefore, the privilege of the "administrator A" on the "OS-A" should not be removed from the "personnel A" from a viewpoint of compliance observation, though the privilege is determined to be removed by the goal privilege state deriving unit 162.

In the case of a lacking privilege or a redundant privilege detected as a compliance violation by the compliance violation verification unit 164, the privilege may be reported as a privilege which should not be given or a privilege which should not be removed. Upon receiving this report, the manager is able to cancel removing the redundant privilege or giving the lacking privilege. Alternatively, in the case of a linkage with the ID provisioning system 138, it is possible to cancel the automatic giving of a lacking privilege or the automatic removal of a redundant privilege determined by the goal privilege state deriving unit 162.

The following describes the processing performed by the audit unit 166, which provides for other exceptions for the above rules, in more detail. While the compliance used by the compliance violation verification unit 164 prescribes a relation between a privilege on a single resource and personnel, the audit rule used by the audit unit 166 prescribes rules of a relation between single personnel and privileges on a plurality of resources. Moreover, while the goal privilege state deriving unit 162 performs processing on the basis of a privilege-dependency relationship between privileges on a resource, the audit rule used by the audit unit 166 is based on an indirect relation between privileges on resources, which is formed through a relation between resources, without a formation of a direct relation between privileges on resources.

Figure 13:
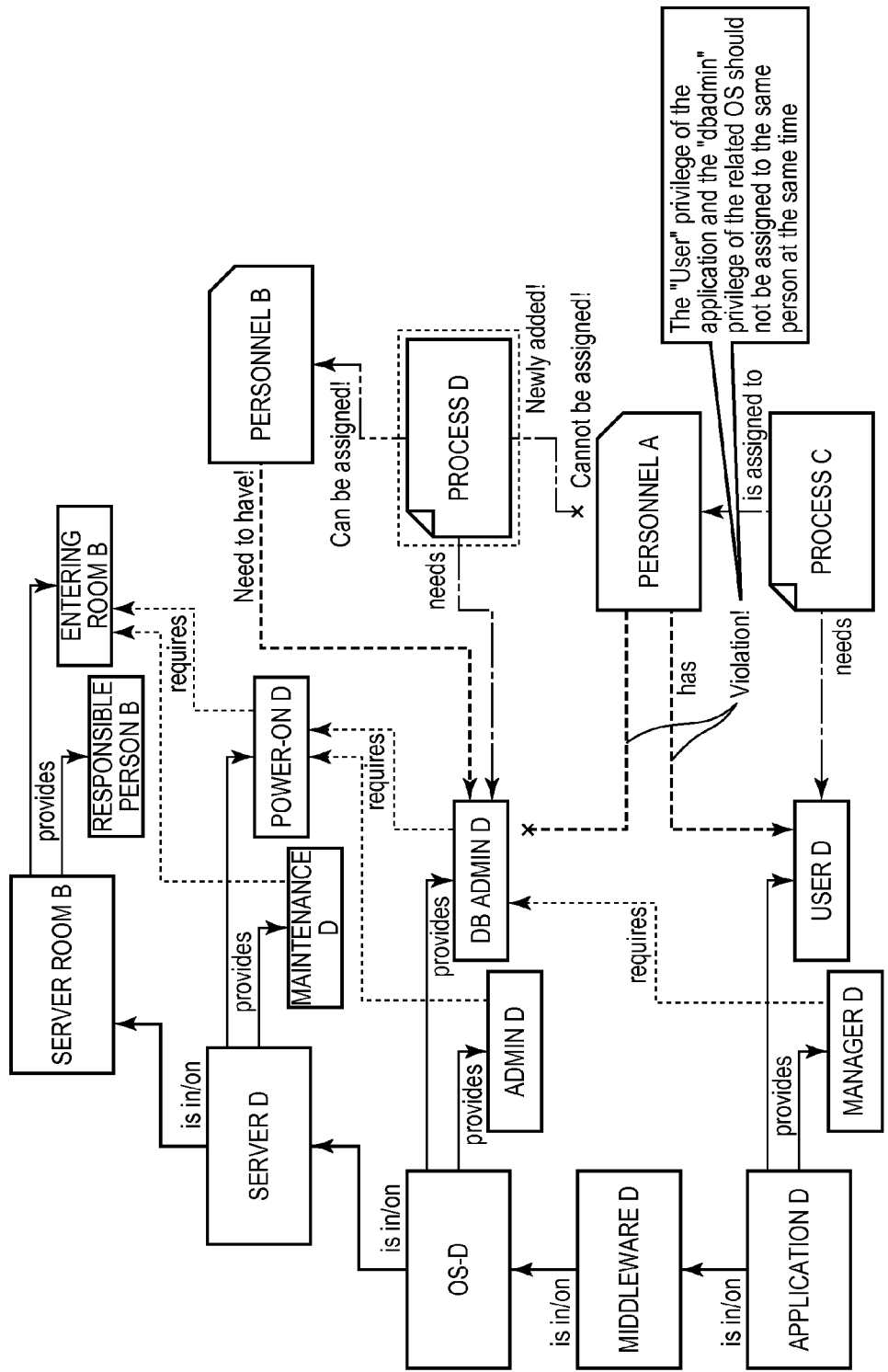
FIG. 13 is a diagram illustrating audit processing according to an embodiment of the present invention.
Figure 14:
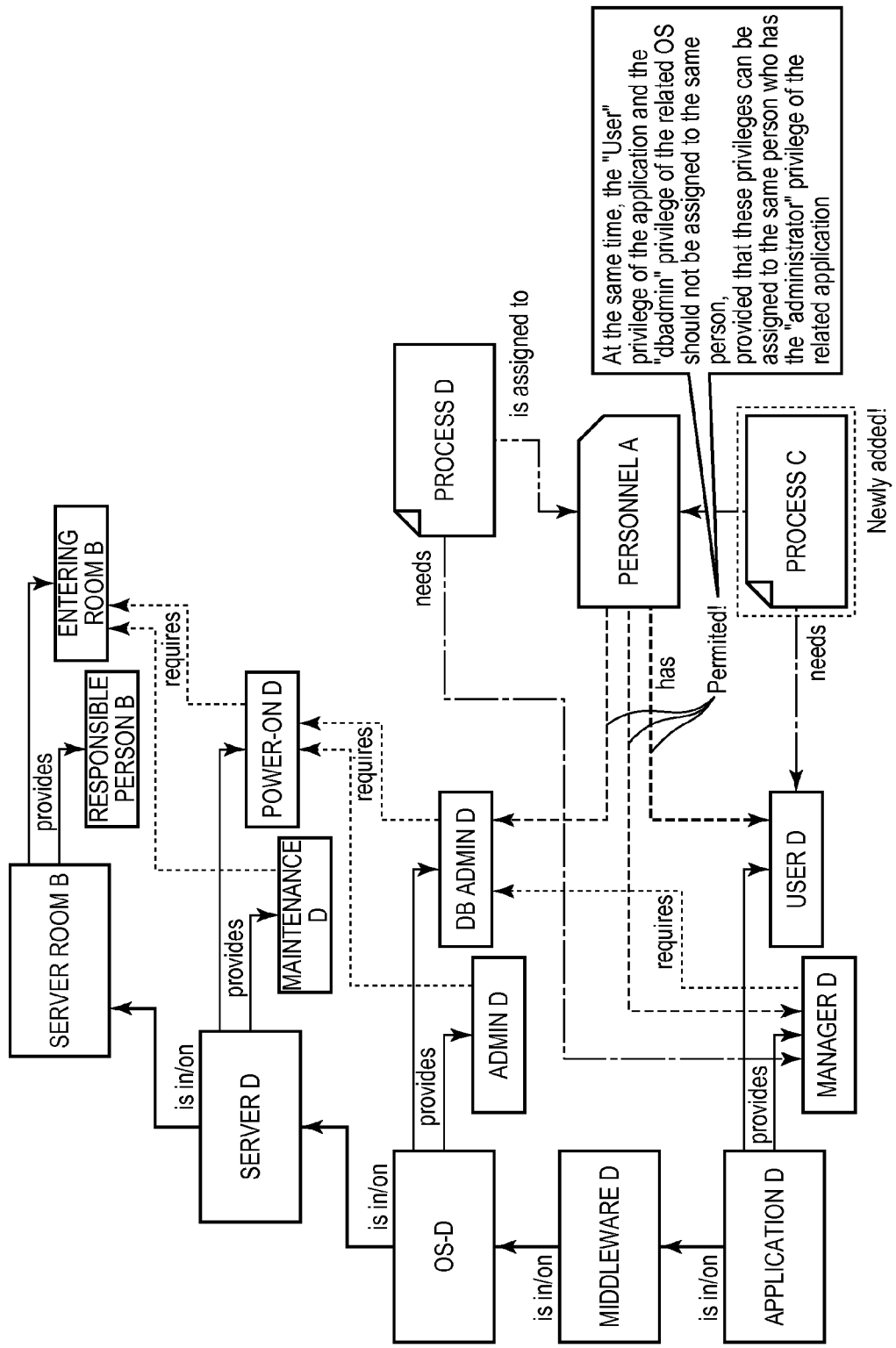
FIG. 14 is a diagram illustrating another audit processing according to an embodiment of the present invention.

As described above, the audit unit 166 conducts an audit to determine whether the predetermined audit rule is not violated as a result of eliminating the inconsistency derived from judgment based on the privilege-dependency relationship. FIG. 13 and FIG. 14 are diagrams each illustrating audit processing. As shown in the example of FIG. 13, the audit rule can be a duty segregation rule. The duty segregation rule is used to eliminate a conflict between privileges given to the same personnel in order to run an organization smoothly and intended to clarify the range of business contents, a privilege, and official responsibilities of each individual or group in an organization such as a company. As an example of the segregation of duties, it is possible to take a rule that an administrative privilege for use in accessing a database related to middleware should not be given to a person (personnel) having a middleware user privilege in order to prevent the middleware user from illegally changing the content of the database.

In the example shown in FIG. 13, there is prescribed an audit rule that a privilege of a "user" of the "middleware D" and a privilege of a "database administrator (abbreviated to DB admin in the diagram) D" of an "OS-D" related to ("is in/on") the "middleware D" are inhibited to be given to the same person (personnel). In FIG. 13, the "process D" requiring the privilege of the database administrator D on the "OS-D" is added anew. If, however, the process is assigned to the "personnel A," the privilege of the "user" of the "middleware D" has already been given to the "personnel A" and therefore the assignment of the "process D" to the "personnel A" violates the audit rule and thus the "process D" should not be assigned to the "personnel A." On the other hand, the privilege of the "user" of the "middleware D" is not given to the "personnel B," and therefore the assignment of the "process D" to the "personnel B" does not violate the audit rule and thus the "process D" may be assigned to the "personnel B."

Moreover, the duty segregation rule may further include an exception rule of the combination of privileges not permitted. In the example shown in FIG. 14, similarly to the example shown in FIG. 13, the audit rule prescribes the principle that the privilege of the "user" of the "middleware D" and the privilege of the "database administrator D" related to the "middleware D" cannot be given to the same personnel. On the other hand, as an exception thereof, the privilege of the "user D" of the "middleware D" and the privilege of the "database administrator D" related to the "middleware D" inhibited in principle in the above are permitted to be given to the same person (personnel) in the case of a person (personnel) having the privilege of the "manager D" of the "middleware D."

As has been described above, according to the embodiment of the present invention, a relation between a privilege on a resource and a resource on another resource is followed, by which the minimum privileges required for personnel can be derived in consideration of the privilege on another resource needed to exercise the privilege on the resource. Therefore, the principle of minimum privileges in security is achieved more easily. Further, the configuration items in the configuration management database 152 are updated on a timely basis. Therefore, even if a change in resources such as an addition of a virtual machine frequently occurs, an optimal state can be maintained while sufficiently adapting to change in configuration.

Further, it is not difficult to distinguish between necessary privileges and unnecessary privileges, which will be performed at the completion of a process or at the expiration of a process. Moreover, the compliance-based rule or the audit rule is defined, by which the minimum privilege state can be maintained under the limitation of the rules.

As described hereinabove, according to the embodiments of the present invention, it is possible to provide an information processor, a privilege management method, a program, and a recording medium for providing support in IT service management on efficiently deriving a goal state, which complies with the standards, which should be given to a person in charge to whom a process is assigned, and thus on maintaining and managing a state where the minimum privileges are given to the person in charge.

The aforementioned functions of the present invention may be implemented by a device-executable program described in an object-oriented programming language such as C++, Java®, JavaBeans®, Java® Applet, JavaScript®, Perl or Ruby, and such a program may be stored in a device-readable recording medium and may be distributed or transmitted for distribution.

While the present invention has been described by way of certain embodiments so far, the present invention is not limited to the above-described embodiments, and another embodiment, addition, change and deletion are all possible as long as they can be arrived at by those skilled in the art. Any embodiment will be within the scope of the present invention as long as the effects of the present invention can be obtained therefrom.

DESCRIPTION OF REFERENCE NUMERALS

100 System
110 Infrastructure
112 Storage
114 Server room
116 Server
118 Hypervisor
120 Virtual machine
122 OS
124 Application
126 Database
130 Storage management tool
132 Entering/leaving management system
134 System management tool
136 Project management system
138 ID provisioning system
140 Management terminal
150 Configuration management device
152 Configuration management database
154 Resource registering unit
156 Privilege-dependency relationship definition unit
158 Process registering unit
160 Personnel registering unit
162 Goal privilege state deriving unit
164 Compliance violation verification unit
166 Audit unit
168 Audit rule database
200 Configuration item table
202, 204, 206 Field
208 Attribute field
210 Relation field

What is claimed is:

1. An information processor comprising:
 a configuration management database that stores resources, personnel, processes, and privileges provided on the resources, as configuration items, respectively, wherein the configuration management database prescribes relations between the configuration items including a privilege-dependency relationship between a privilege configuration item on a resource and another privilege configuration item on another resource required to exercise the privilege configuration item on the resource, a privilege-request relationship between a process configuration item and a privilege configuration item required for the process configuration item, and a privilege-giving relationship between certain of the personnel and a privilege given to the certain of the personnel;

a privilege deriving unit that accesses the configuration management database, responsive to a process being assigned to corresponding personnel, to derive a goal state of a privilege on a resource that is required for the process and is to be given to the corresponding personnel by accessing in the configuration management database a given privilege-request relationship for the process; and a dependence relation definition unit that defines another privilege-dependency relationship that is made between a privilege on an existing resource and a privilege on another resource according to a condition associated with the existing resource, and prescribes how the existing resource is related to the another resource, when the another resource is associated with the existing resource.

2. The information processor according to claim 1, wherein the privilege deriving unit derives an inconsistency between the goal state and a current state with respect to each of the corresponding personnel assigned to one or more existent processes by accessing respective privilege-request relationships for the one or more existent processes.

3. The information processor according to claim 2, further comprising a rule violation verification unit for verifying whether a lacking or redundant privilege for the corresponding personnel derived as the inconsistency violates rules with respect to a relation set between the privilege on the resource and one or more personnel when the lacking or redundant privilege is eliminated.

4. The information processor according to claim 3, further comprising an audit unit for verifying whether the lacking privilege for the corresponding personnel derived as the inconsistency violates an audit rule, which prescribes a combination of privileges that are not permitted to the same personnel between related resources when the lacking privilege is eliminated.

5. The information processor according to claim 4, wherein the audit rule includes an exception rule of the combination of privileges not permitted.

6. The information processor according to claim 1, further comprising a process registering unit for obtaining a privilege on a resource required for a new process and a specification of the corresponding personnel that the new process is assigned to, defining a relationship between the new process and the privilege on the resource required for the new process, and registering the new process as a configuration item in the configuration management database.

7. The information processor according to claim 6, further comprising:

a resource registering unit for detecting a resource to be a target of service management and registering the resource and the privilege on the resource as configuration items in the configuration management database; and a personnel registering unit for registering personnel to be a target of service management as a configuration item in the configuration management database.

8. The information processor according to claim 1, wherein the configuration management database is a component in an Information Technology Infrastructure Library (ITIL) framework and is configured to manage configuration elements as configuration items (CI), including hardware resources, software resources, and human resources.

9. A privilege management method, which is performed by a computer system, for managing privileges given to corresponding personnel to whom a process is assigned, the method comprising the steps in which:

the computer system references a configuration management database that stores resources, personnel, processes, and privileges provided on the resources, as configuration items, respectively, wherein the configuration management database prescribes relations between the configuration items including a privilege-dependency relationship between a privilege configuration item on a resource and another privilege configuration item on another resource required to exercise the privilege configuration item on the resource, a privilege-request relationship between a process configuration item and a privilege configuration item required for the process configuration item, and a privilege-giving relationship between certain of the personnel and a privilege given to the certain of the personnel;

the computer system derives a goal state of a privilege on a resource that is required for the process and is to be given to corresponding personnel by accessing in the configuration management database, responsive to the process being assigned to the corresponding personnel, a given privilege-request relationship for the process;

the computer system detects that another resource is associated with an existing resource; and the computer system defines another privilege-dependency relationship that is made between a privilege on the existing resource and a privilege on the another resource according to a condition associated with the existing resource, prescribing how the existing resource is related to the another resource.

10. The privilege management method according to claim 9, wherein the deriving step includes the step in which the computer system derives an inconsistency between the goal state and a current state with respect to each of the corresponding personnel assigned to one or more existent processes by accessing respective privilege-request relationships for the one or more existent processes, in response to a completion of an assigned process or to an end of a period set for the assigned process.

11. A computer-executable program stored on a non-transitory recording medium, wherein the computer-executable program causes a computer system, when the computer-executable program is executed by the computer system, to perform the steps of claim 9.

12. The privilege management method according to claim 9, wherein the configuration management database is a component in an Information Technology Infrastructure Library (ITIL) framework and is configured to manage configuration elements as configuration items (CI), including hardware resources, software resources, and human resources.

* * * * *